US012724329B2

(12) United States Patent
Li et al.

(10) Patent No.: US 12,724,329 B2
(45) Date of Patent: Sep. 1, 2026

(54) DRIVE MOTOR, CAMERA MODULE, AND ELECTRONIC DEVICE

(71) Applicant: Huawei Technologies Co., Ltd., Shenzhen (CN)

(72) Inventors: Zhangcheng Li, Shanghai (CN); Pei Huang, Shanghai (CN); Yingfei Shu, Shanghai (CN); Zhanli Sun, Shanghai (CN); Sikun Li, Shanghai (CN); Zhi Yuan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 18/552,033

(22) PCT Filed: Mar. 21, 2022

(86) PCT No.: PCT/CN2022/082073

§ 371 (c)(1),
(2) Date: Sep. 22, 2023

(87) PCT Pub. No.: WO2022/199538

PCT Pub. Date: Sep. 29, 2022

(65) Prior Publication Data

US 2024/0176217 A1 May 30, 2024

(30) Foreign Application Priority Data

Mar. 25, 2021 (CN) ......................... 202110321005.4
Apr. 28, 2021 (CN) ......................... 202110470559.0

(51) Int. Cl.
*G03B 17/55* (2021.01)
*G03B 17/17* (2021.01)
(Continued)

(52) U.S. Cl.
CPC ............ *G03B 17/55* (2013.01); *G03B 17/17* (2013.01); *H02K 3/04* (2013.01); *H02K 7/14* (2013.01); *H02K 9/22* (2013.01); *H02K 41/0354* (2013.01)

(58) Field of Classification Search
USPC ........................................... 310/12.01–12.33
See application file for complete search history.

(56) References Cited

U.S. PATENT DOCUMENTS

2017/0151750 A1* 6/2017 Takasu .................... C23C 14/20
2018/0209635 A1* 7/2018 Luiten .................. F21V 29/713
(Continued)

FOREIGN PATENT DOCUMENTS

CN 1783249 A 6/2006
CN 104317032 A 1/2015
(Continued)

OTHER PUBLICATIONS

JP-2006031787-A machine translation (Year: 2006).*
CN-210488098-U machine translation (Year: 2020).*

*Primary Examiner* — Oluseye Iwarere
*Assistant Examiner* — Minki Chang
(74) *Attorney, Agent, or Firm* — Slater Matsil, LLP

(57) ABSTRACT

In accordance with an embodiment, a drive motor includes a carrier comprising a lens installation hole configured to have an optical lens installed therein; a coil located on an outer side of the carrier; and a coil heat dissipation structure located between the carrier and the coil, wherein the coil heat dissipation structure is fastened to the carrier, and the coil is fastened to and is in thermal conduction with the coil heat dissipation structure.

20 Claims, 30 Drawing Sheets

(51) Int. Cl.

| | |
|---|---|
| ***H02K 3/04*** | (2006.01) |
| ***H02K 7/14*** | (2006.01) |
| ***H02K 9/22*** | (2006.01) |
| ***H02K 41/035*** | (2006.01) |

(56) References Cited

U.S. PATENT DOCUMENTS

| | | | | |
|---|---|---|---|---|
| 2019/0101731 | A1 * | 4/2019 | Sekiguchi | G02B 13/0065 |
| 2019/0391360 | A1 * | 12/2019 | Chang | G02B 7/08 |
| 2020/0249469 | A1 * | 8/2020 | Raab | H02K 3/46 |

FOREIGN PATENT DOCUMENTS

| | | | | |
|---|---|---|---|---|
| CN | 106537252 | B | | 3/2020 |
| CN | 210488098 | U | * | 5/2020 |
| CN | 211046982 | U | | 7/2020 |
| CN | 212160207 | U | | 12/2020 |
| JP | 2006031787 | A | * | 2/2006 |
| RU | 128938 | U1 | | 6/2013 |

* cited by examiner

DRIVE MOTOR, CAMERA MODULE, AND ELECTRONIC DEVICE

CROSS-REFERENCE TO RELATED APPLICATIONS

This application is a national stage of International Application No. PCT/CN2022/082073, filed on Mar. 21, 2022, which claims priority to Chinese Patent Application No. 202110321005.4, filed on Mar. 25, 2021 and Chinese Patent Application No. 202110470559.0, filed on Apr. 28, 2021. All of the aforementioned applications are hereby incorporated by reference in their entireties.

TECHNICAL FIELD

This application relates to the field of electronic device technologies, and in particular, to a drive motor, a camera module, and an electronic device.

BACKGROUND

Currently, electronic devices such as a mobile phone, a tablet computer, and a personal computer (Personal Computer, PC) all have a camera module. The camera module is configured to take a picture/video. An optical lens (lens) is an optical component of the camera module, and optical performance of the lens directly affects photographing quality of the camera module.

In some high-end electronic devices, a drive motor is usually integrated into the camera module. The drive motor is configured to drive the optical lens to move relative to an image sensor, to implement automatic focusing (Automatic Focusing, AF) and/or optical image stabilization (Optical Image Stabilization, OIS). With development of photography and image shooting technologies of the electronic device, the camera module has an increasingly high requirement on an ultimate focusing and/or image stabilization stroke, and large-stroke automatic focusing and/or optical image stabilization are/is used in an increasing quantity of scenarios. For a type of camera module integrated with the drive motor, how to implement large-stroke automatic focusing and/or optical image stabilization without increasing a volume of the camera module and also ensure optical performance of the optical lens is an important research direction of manufacturers.

SUMMARY

Embodiments of this application provide a drive motor, a camera module, and an electronic device, to increase a focusing and/or image stabilization stroke of the camera module without increasing a volume of the camera module, and ensure optical performance of an optical lens.

To achieve the foregoing objectives, the following technical solutions are used in embodiments of this application.

According to a first aspect, some embodiments of this application provide a drive motor. The drive motor includes a carrier, a coil, and a coil heat dissipation structure. A lens installation hole is provided in the carrier, and the lens installation hole is configured to install an optical lens. The coil is located on an outer side of the carrier. The coil heat dissipation structure is a high thermal conduction structure. The coil heat dissipation structure is located between the coil and the carrier, the coil heat dissipation structure is fastened to the carrier, and the coil thermal conduction is fastened to the coil heat dissipation structure with thermal conduction.

According to the drive motor provided in embodiments of this application, when a volume of the drive motor is not changed and large-stroke automatic focusing and/or optical image stabilization are/is implemented, because the coil thermal conduction is fastened to the coil heat dissipation structure, heat generated when the coil works may be conducted to the coil heat dissipation structure, and dissipated by using the coil heat dissipation structure. In this way, impact of the heat generated when the coil works on the optical lens can be reduced, thereby ensuring optical performance of the optical lens.

In a possible implementation of the first aspect, an orthographic projection area of the coil on a first surface of the carrier is less than an orthographic projection area of the coil heat dissipation structure on the first surface of the carrier. The first surface is a surface that is on the carrier and that is configured to install the coil. In this way, the coil heat dissipation structure may disperse heat of the coil to a large region of a side wall of the carrier, to avoid heat concentration. In this way, the impact of the heat generated when the coil works on the optical lens can be reduced.

In a possible implementation of the first aspect, a material of the coil heat dissipation structure includes one or more of metal, non-metal doped with metal powder, graphite, thermal adhesive, and thermally conductive silicone, where the metal is one or more of copper, iron, aluminum, a copper alloy, a ferroalloy, an aluminum alloy, and the like.

In a possible implementation of the first aspect, the coil heat dissipation structure includes a metal layer and a graphite layer that are disposed in a stacked manner. The metal layer and the coil are fastened with thermal conduction, and the graphite layer is located on a side of the metal layer close to the lens installation hole, where a material of the metal layer is one or more of copper, iron, aluminum, a copper alloy, a ferroalloy, an aluminum alloy, and the like. Both the metal layer and the graphite layer have high thermal conductivity coefficients. Therefore, heat of the coil can be quickly absorbed. A difference lies in that the metal layer has good thermal conduction performance in any direction, while the graphite layer has thermal conduction directivity. Specifically, the graphite layer has good thermal conduction performance in a plane in which the graphite layer is located, and has poor thermal conduction performance in a direction perpendicular to the plane in which the graphite layer is located. The reason is that molecules of the graphite layer have a network structure in the plane in which the graphite layer is located, connection tightness between the molecules is good, and the thermal conduction performance is good. However, the molecules in the direction perpendicular to the plane in which the molecules are located are superimposed layer by layer, and connection tightness between two adjacent layers of molecules is poor; and therefore the thermal conduction performance is poor. In this way, the graphite layer can prevent the heat generated by the coil from being conducted to a side close to the lens installation hole.

In a possible implementation of the first aspect, the drive motor further includes damping adhesive and a seat body. The damping adhesive is disposed on the carrier, and the carrier is in contact with the seat body through the damping adhesive. In this way, structural compactness of the drive motor can be improved, and impact wear caused by collision between the carrier and the seat body can be reduced in a moving process.

In a possible implementation of the first aspect, the damping adhesive is a high thermal conduction structure. Specifically, the damping adhesive is at least one of silicon gel and acrylate rubber. The damping adhesive is in thermal conduction with the coil heat dissipation structure. In this way, the heat of the coil may be conducted to the damping adhesive, and further conducted to the seat body by using the damping adhesive. To some extent, conduction of the heat of the coil to the optical lens can be avoided. In this way, the impact of the heat generated by the coil on the optical lens can be further reduced.

In a possible implementation of the first aspect, the drive motor further includes a drive chip and a chip heat dissipation structure. The drive chip is fastened to the seat body. The chip heat dissipation structure is a high thermal conduction structure and the chip heat dissipation structure includes a first part and a second part. The first part is located on a side of the drive chip close to the carrier, and the first part is in thermal conduction with the drive chip. The second part is fastened to the seat body with thermal conduction. In this way, the first part may absorb heat of the drive chip, and the heat absorbed by the first part may be conducted to the seat body by using the second part, to avoid transmission of the heat of the drive chip to the carrier.

In a possible implementation of the first aspect, a projection of the drive chip on the first part along a direction close to the carrier is located in the first part. In this way, the first part can shield the drive chip, to absorb the heat generated by the drive chip during a working process to a large extent.

In a possible implementation of the first aspect, a groove is provided on a surface of the seat body facing the carrier. The drive chip is accommodated in the groove, and the first part covers and is fastened to an opening of the groove. In this way, heat radiated by the drive chip to a side close to the carrier is transmitted to the first part in a centralized manner under limitation of the groove. In this way, the first part can absorb the heat of the drive chip to a large extent.

In a possible implementation of the first aspect, the first part and the drive chip are spaced apart, and a gap width between the first part and the drive chip is greater than 0 mm and less than or equal to 1 mm. In this way, a distance between the first part and the drive chip is moderate, and the heat of the drive chip can be transmitted to the first part to a large extent. In addition, when the first part is made of a conductive material such as metal, impact of the first part on electrical performance of the drive chip can be avoided, thereby ensuring reliability of the drive chip.

In a possible implementation of the first aspect, a material of the first part includes one or more of metal, non-metal doped with metal powder, graphite, thermal adhesive, and thermally conductive silicone, where the metal is one or more of copper, iron, aluminum, a copper alloy, a ferroalloy, an aluminum alloy, and the like.

In a possible implementation of the first aspect, the first part includes a metal layer and a graphite layer that are disposed in a stacked manner. The metal layer is in thermal conduction with the drive chip, and the graphite layer is located on a side of the metal layer close to the carrier, where a material of the metal layer is one or more of copper, iron, aluminum, a copper alloy, a ferroalloy, an aluminum alloy, and the like. Both the metal layer and the graphite layer have high thermal conductivity coefficients. Therefore, the heat of the drive chip can be quickly absorbed. In addition, the graphite layer can prevent the heat generated by the drive chip from being transmitted to the side close to the carrier, thereby further reducing the impact of the heat generated by the drive chip on the optical lens in the carrier.

In a possible implementation of the first aspect, the second part is located on a side of the seat body away from the carrier, and the second part is in contact with and fastened to a surface of the seat body away from the carrier. In this way, the heat absorbed by the first part can be conducted, by using the second part, to a surface of a substrate portion away from the carrier, to avoid heat transmission to the direction close to the carrier. In this way, the impact of the heat generated by the drive chip on the optical lens is reduced.

According to a second aspect, some embodiments of this application provide a drive motor. The drive motor includes a carrier, a seat body, a drive chip, and a chip heat dissipation structure. A lens installation hole is provided in the carrier, and the lens installation hole is configured to install an optical lens. The drive chip is fastened to the seat body. The chip heat dissipation structure is a high thermal conduction structure, and the chip heat dissipation structure includes a first part and a second part. The first part is located on a side of the drive chip close to the carrier, and the first part is in thermal conduction with the drive chip. The second part is fastened to the seat body with thermal conduction.

In the drive motor provided in embodiments of this application, when a volume of the drive motor is not changed and large-stroke automatic focusing and/or optical image stabilization are/is implemented, because the first part is located on the side of the drive chip close to the carrier, and the first part is in thermal conduction with the drive chip, the first part can absorb the heat of the drive chip. In addition, because the second part is fastened to the seat body with thermal conduction, the heat absorbed by the first part may be conducted to the seat body by using the second part, to avoid transmission of the heat of the drive chip to the carrier. In this way, impact of heat generated when the drive chip works on the optical lens can be reduced, thereby ensuring optical performance of the optical lens.

In a possible implementation of the second aspect, a projection of the drive chip on the first part along a direction close to the carrier is located in the first part. In this way, the first part can shield the drive chip, to absorb the heat generated by the drive chip during a working process to a large extent.

In a possible implementation of the second aspect, a groove is provided on a surface of the seat body facing the carrier. The drive chip is accommodated in the groove, and the first part covers and is fastened to an opening of the groove. In this way, heat radiated by the drive chip to a side close to the carrier is transmitted to the first part in a centralized manner under limitation of the groove. In this way, the first part can absorb the heat of the drive chip to a large extent.

In a possible implementation of the second aspect, the first part and the drive chip are spaced apart, and a gap width between the first part and the drive chip is greater than 0 mm and less than or equal to 1 mm. In this way, a distance between the first part and the drive chip is moderate, and the heat of the drive chip can be transmitted to the first part to a large extent. In addition, when the first part is made of a conductive material such as metal, impact of the first part on electrical performance of the drive chip can be avoided, thereby ensuring reliability of the drive chip.

In a possible implementation of the second aspect, a material of the first part includes one or more of metal, non-metal doped with metal powder, graphite, thermal adhesive, and thermally conductive silicone, where the metal is one or more of copper, iron, aluminum, a copper alloy, a ferroalloy, an aluminum alloy, and the like.

In a possible implementation of the second aspect, the first part includes a metal layer and a graphite layer that are disposed in a stacked manner. The metal layer is in thermal conduction with the drive chip, and the graphite layer is located on a side of the metal layer close to the carrier. A material of the metal layer is one or more of copper, iron, aluminum, a copper alloy, a ferroalloy, an aluminum alloy, and the like. Both the metal layer and the graphite layer have high thermal conductivity coefficients. Therefore, the heat of the drive chip can be quickly absorbed. In addition, the graphite layer can prevent the heat generated by the drive chip from being transmitted to the side close to the carrier, thereby further reducing the impact of the heat generated by the drive chip on the optical lens in the carrier.

In a possible implementation of the second aspect, the second part is located on a side of the seat body away from the carrier, and the second part is in contact with and fastened to a surface of the seat body away from the carrier. In this way, the heat absorbed by the first part can be conducted, by using the second part, to a surface of a substrate portion away from the carrier, to avoid heat transmission to the direction close to the carrier. In this way, the impact of the heat generated by the drive chip on the optical lens is reduced.

According to a third aspect, some embodiments of this application provide a camera module. The camera module includes an optical lens, a photosensitive component, and the drive motor according to any one of the foregoing technical solutions. The optical lens is installed in a lens installation hole of the drive motor. The photosensitive component is located on an out-light side of the optical lens, and the photosensitive component and the drive motor are fixed.

The camera module provided in embodiments of this application includes the drive motor described in any one of the foregoing technical solutions. Therefore, the camera module and the drive motor can resolve a same technical problem, and achieve a same technical effect.

In a possible implementation of the third aspect, the camera module further includes an optical path turning element. The optical path turning element is located on a light incident side of the optical lens. The optical path turning element is configured to turn light incident in a first direction to be emitted in a second direction, where the first direction is perpendicular to the second direction. A light incident surface of the optical lens is opposite to an out-light surface of the optical path turning element, and a second direction is parallel to an optical axis of the optical lens. In this way, the camera module is a periscope camera module. An automatic focusing direction of the periscope camera module is perpendicular to a thickness direction of an electronic device. Therefore, the periscope camera module may be used in a long-focus camera module.

In a possible implementation of the third aspect, the camera module further includes a camera support. An inner hole is provided in the camera support, and the drive motor is disposed in the inner hole. A connector is disposed on an outer wall of the camera support, and the camera support is configured to be fastened in the electronic device by using the connector. In this way, the camera module is conveniently fastened in the electronic device.

In a possible implementation of the third aspect, the camera support is made of a metal material. The camera module further includes a seat body heat dissipation structure. The seat body heat dissipation structure is a high thermal conduction structure, and the seat body heat dissipation structure is fastened between the seat body of the drive motor and the camera support with thermal conduction. In this way, heat of a coil or heat of a drive chip may be further conducted to the camera support by using the seat body heat dissipation structure, and further conducted to the electronic device by using the camera support.

In a possible implementation of the third aspect, the seat body heat dissipation structure is in contact with a second part of a chip heat dissipation structure. In this way, the heat of the drive chip can be quickly conducted to the camera support, and heat dissipation efficiency of the drive chip is high.

According to a fourth aspect, some embodiments of this application provide an electronic device, where the electronic device includes a bezel, a middle plate, and the camera module according to any one of the foregoing technical solutions. The middle plate is fastened in the bezel, and the camera module is fastened to the middle plate.

In the electronic device provided in embodiments of this application, because the middle plate is fastened in the bezel and the camera module is fastened to the middle plate, heat of the camera module may be conducted to the bezel through the middle plate, and further conducted to an external environment through the bezel. Therefore, optical performance of the optical lens can be further improved.

Figure 4:
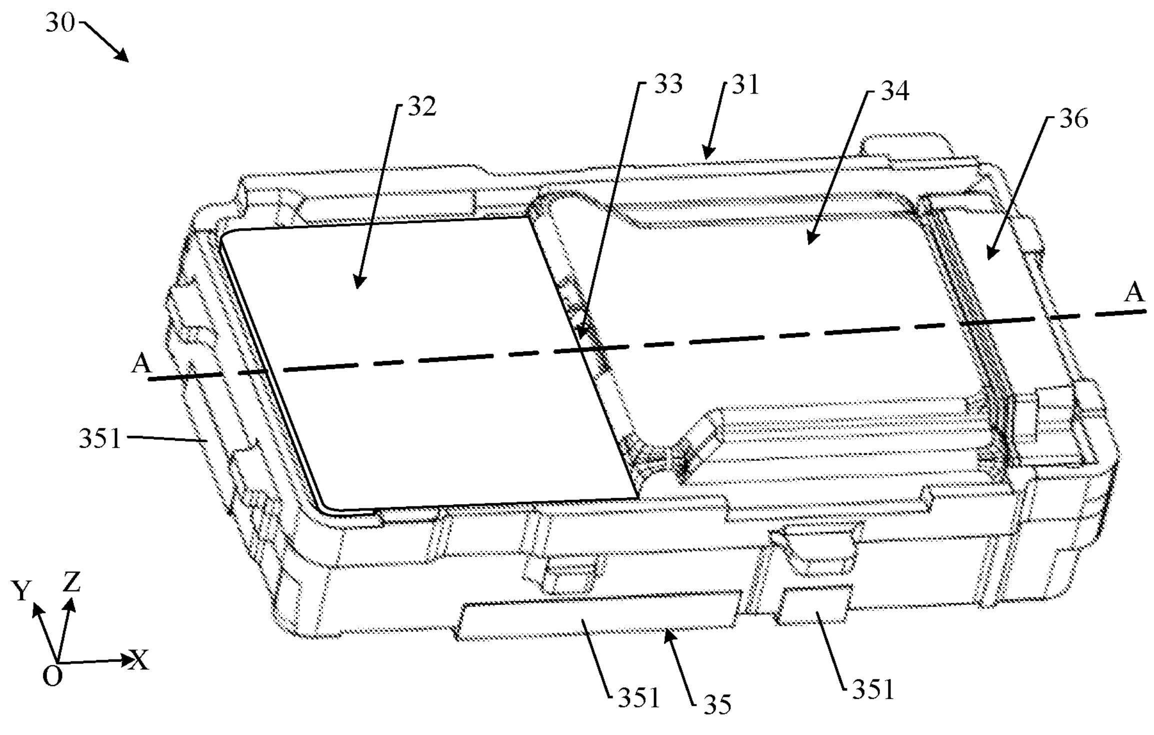
FIG. 4 is a three-dimensional view of a camera module in the electronic device shown in FIG. 1 and FIG. 2.
Figure 5:
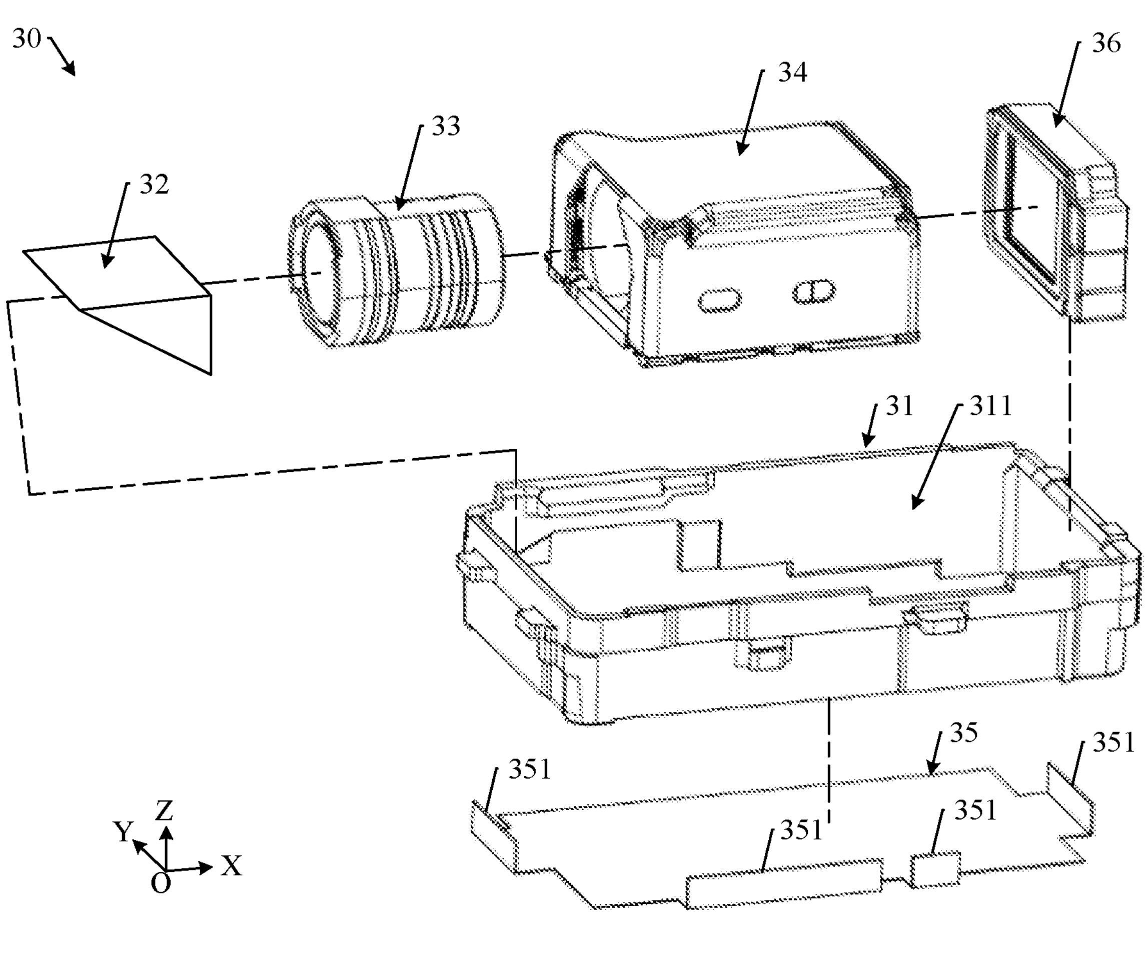
FIG. 5 is an exploded view of the camera module shown in FIG. 4.
Figure 6:
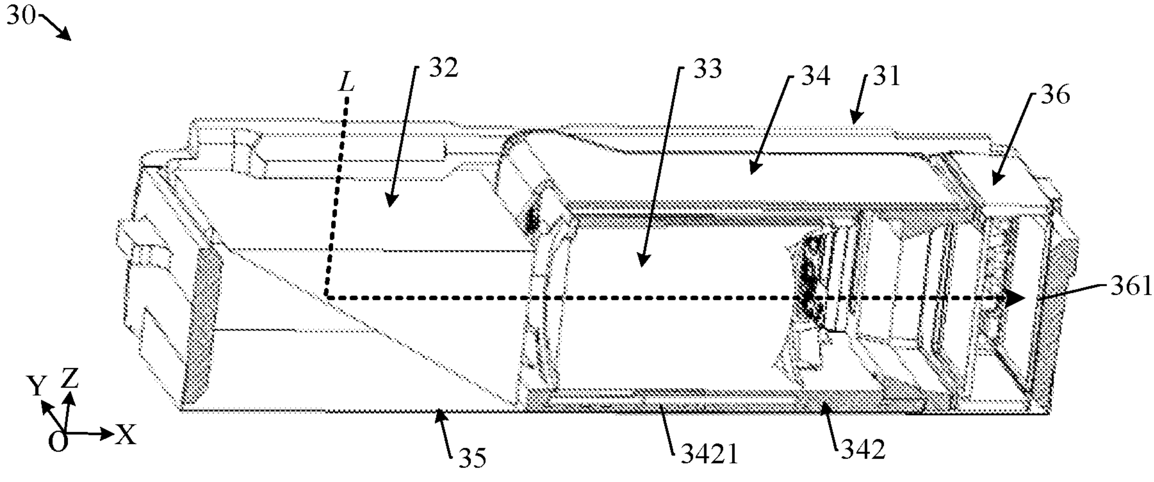
FIG. 6 is a three-dimensional cutaway view of the camera module shown in FIG. 4 at an A-A line.
Figure 10:
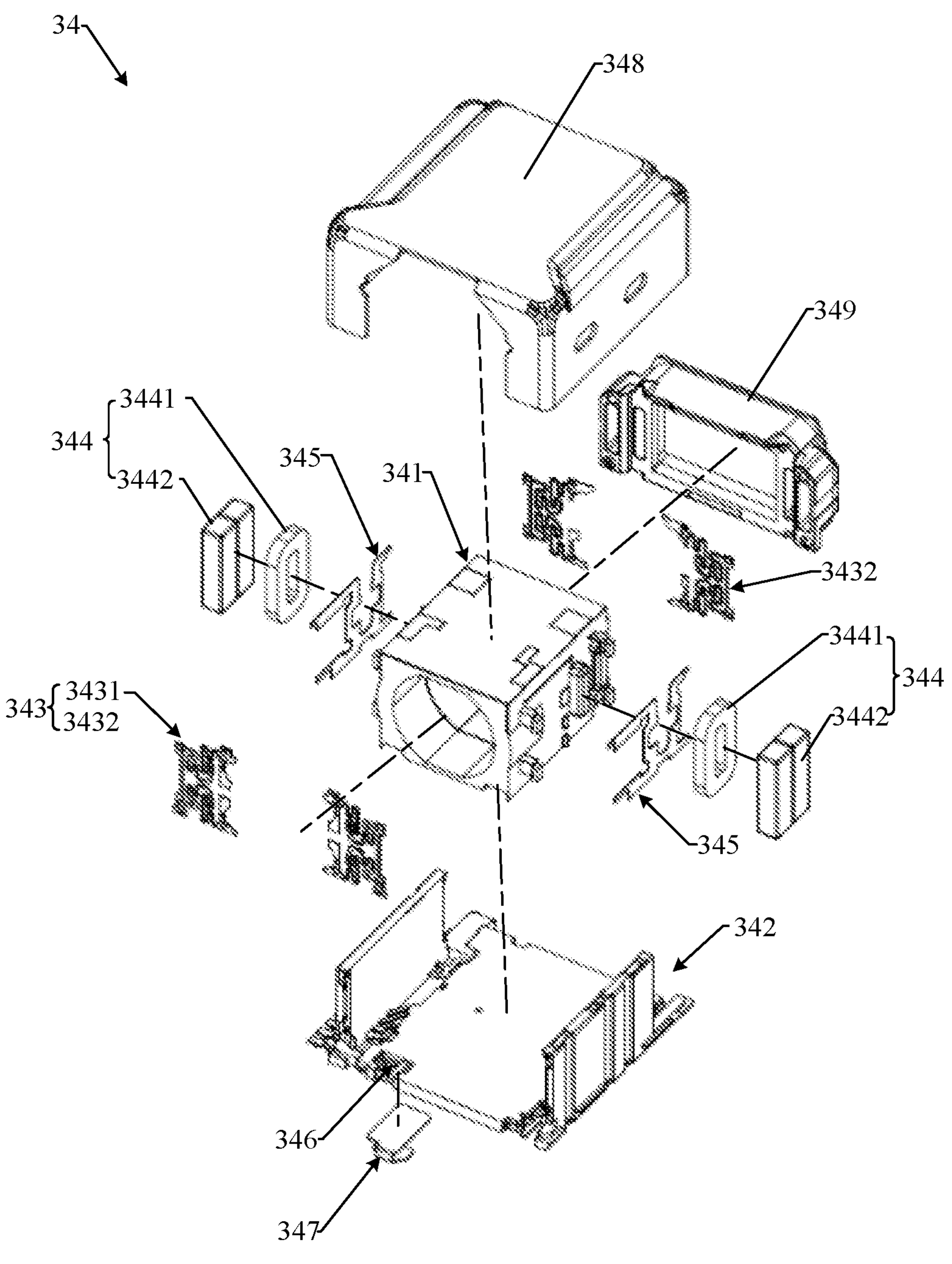
FIG. 10 is an exploded view of the drive motor shown in FIG. 9.
Figure 15A:
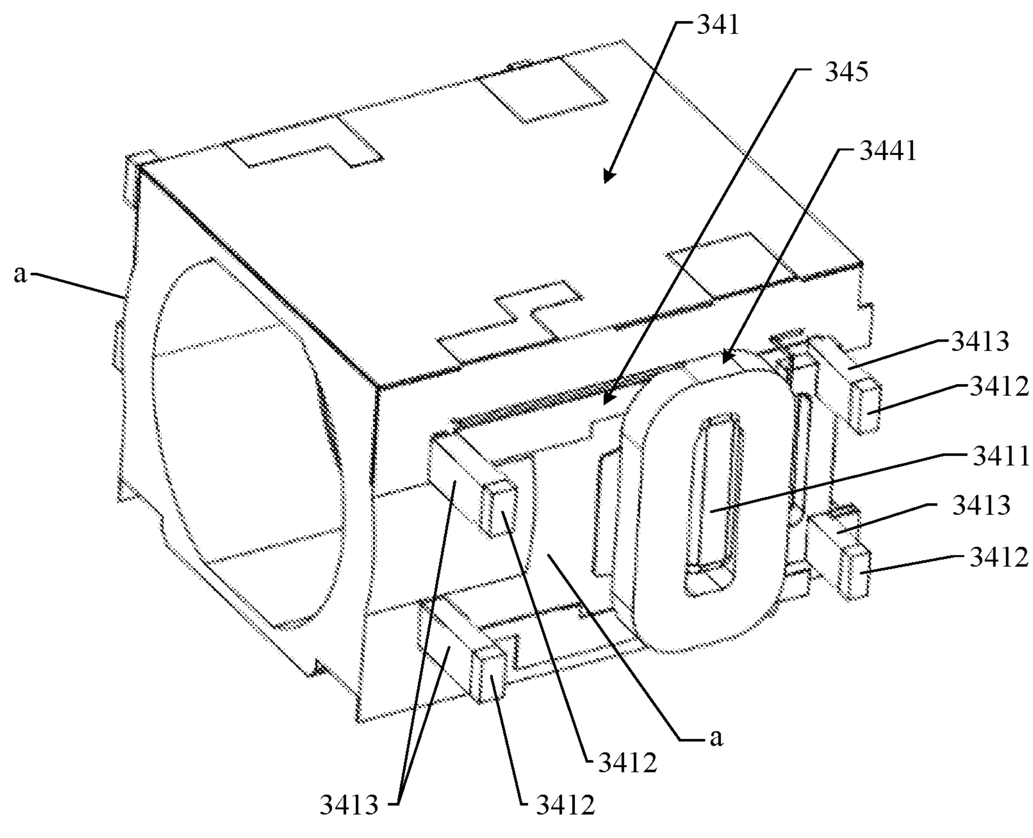
Figure 16:
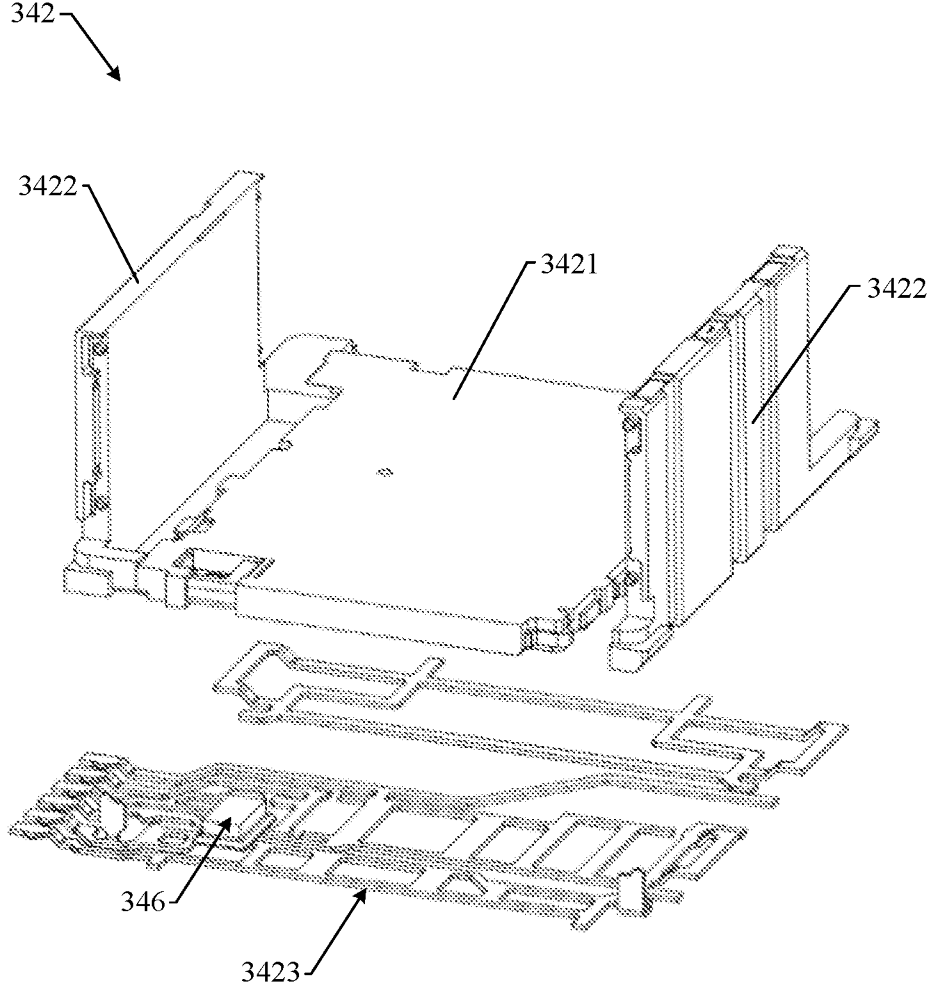
Figure 17:
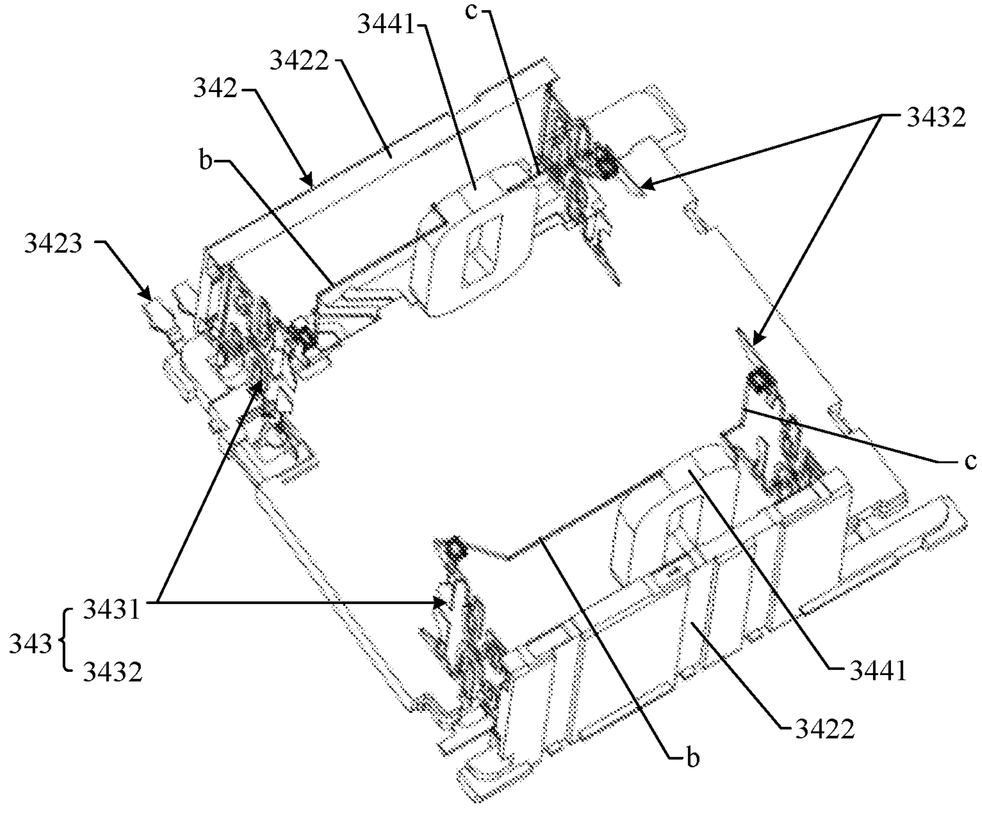
Figure 18:
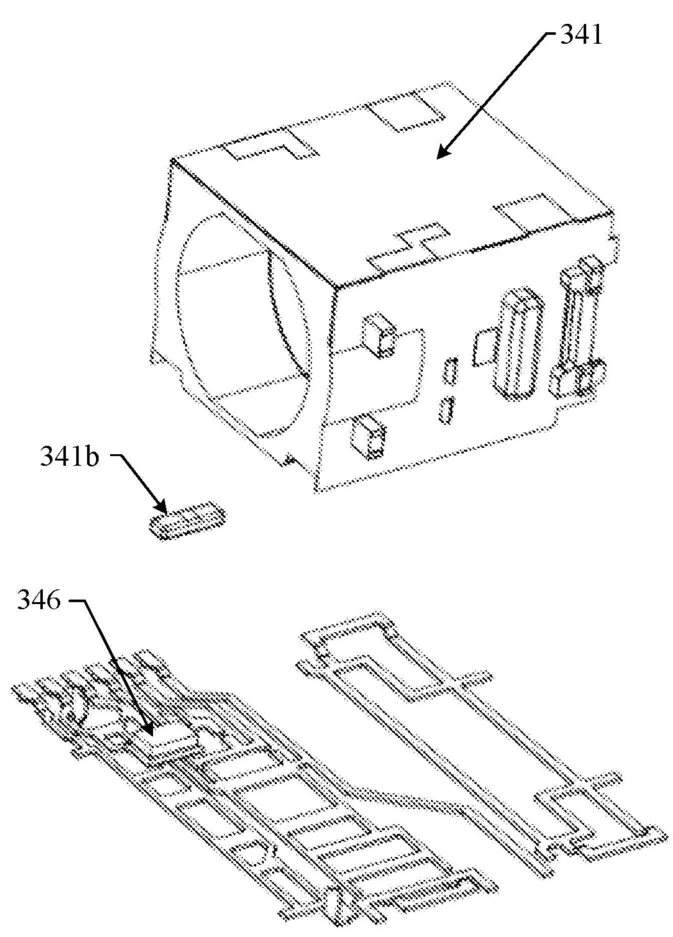
Figure 19:
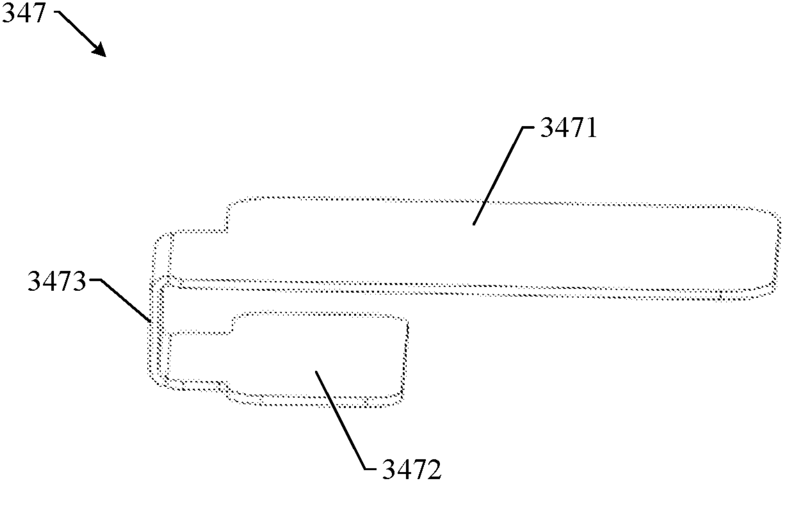
Figure 20:
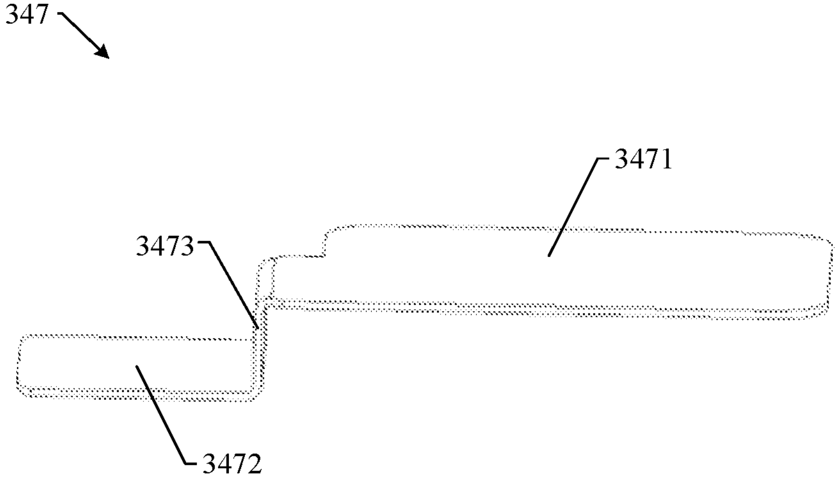
Figure 21:
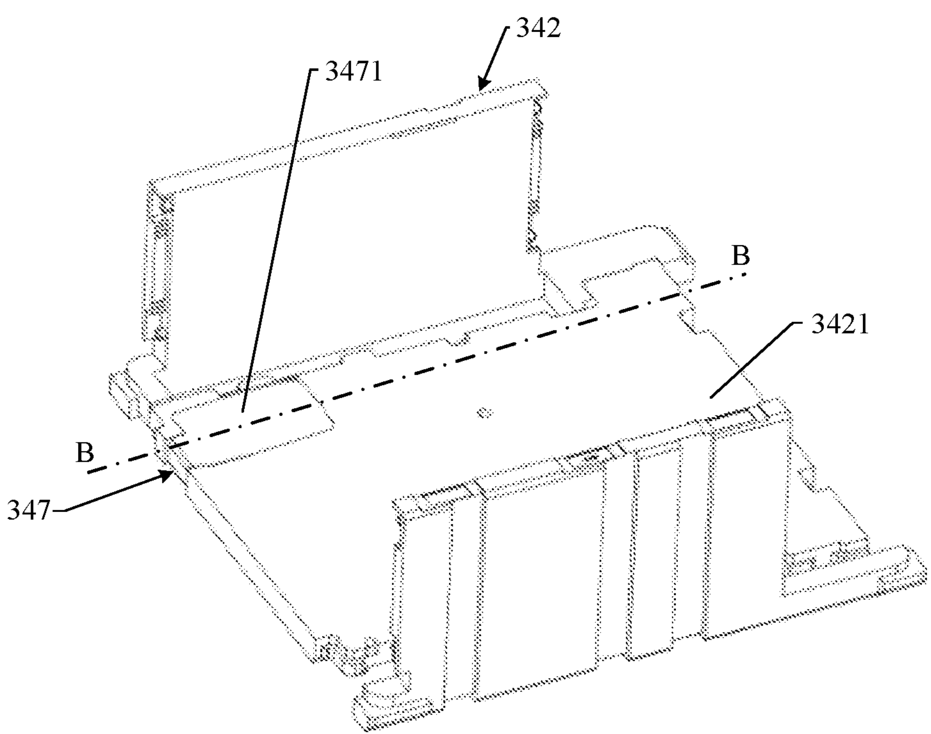
Figure 22:
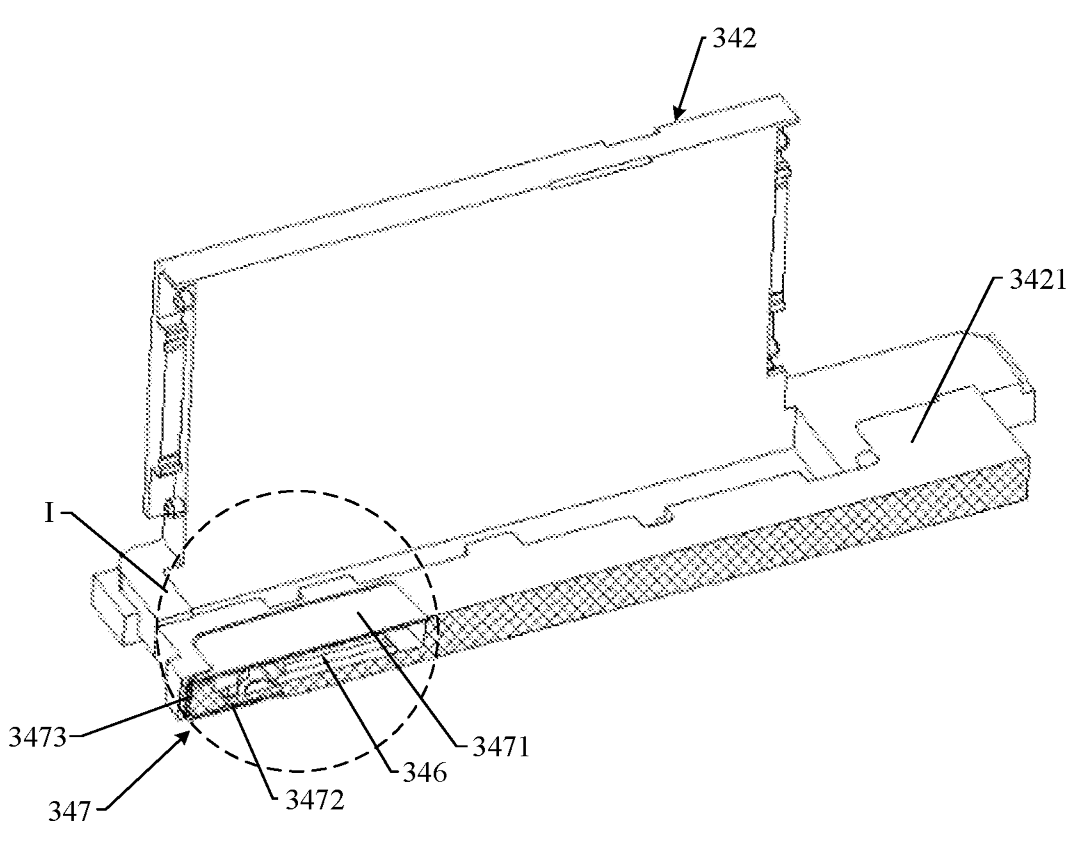
Figure 23:
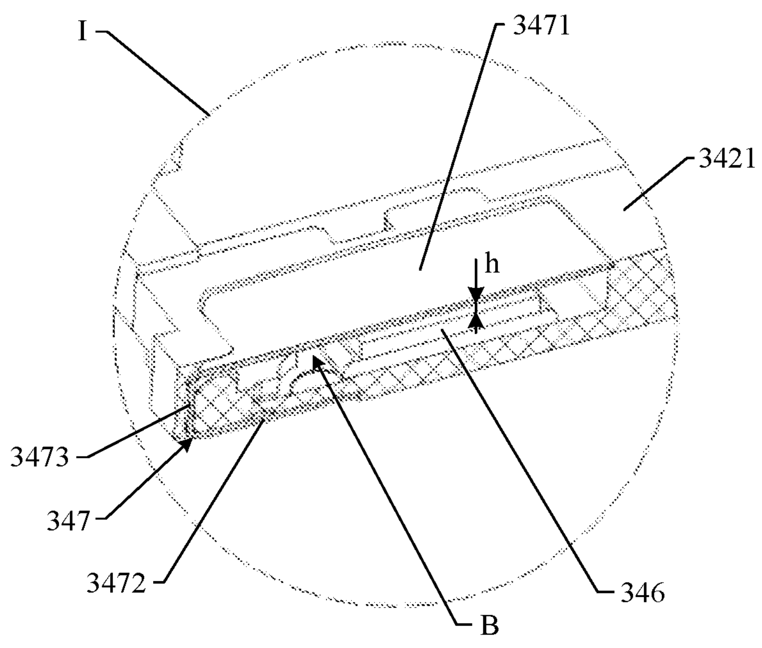
Figure 24:
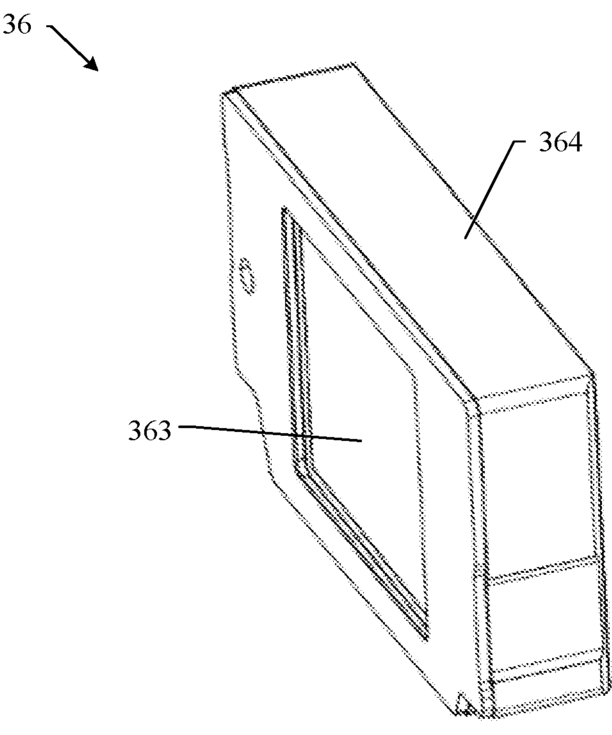
Figure 25:
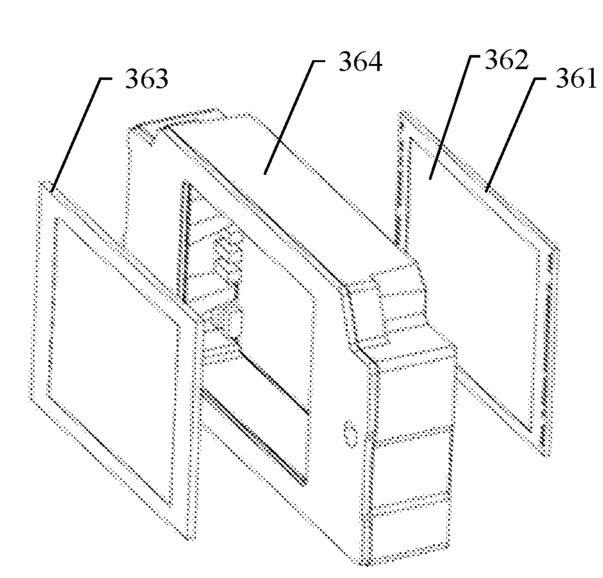
Figure 26:
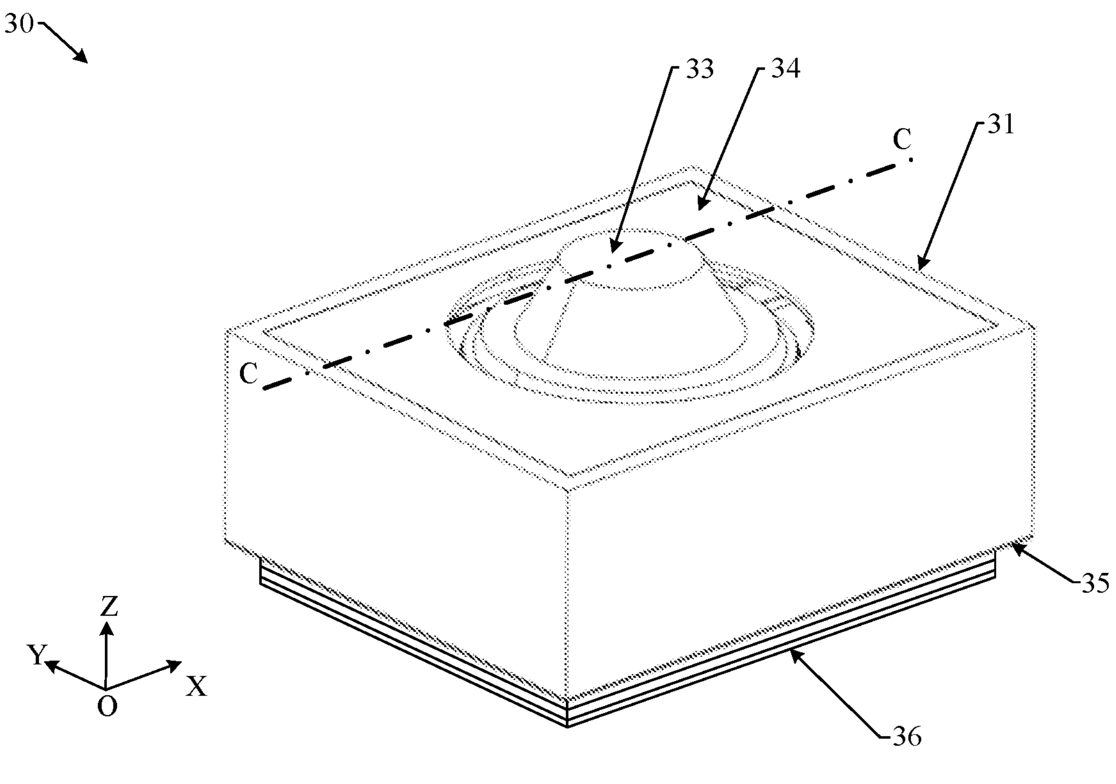
Figure 27:
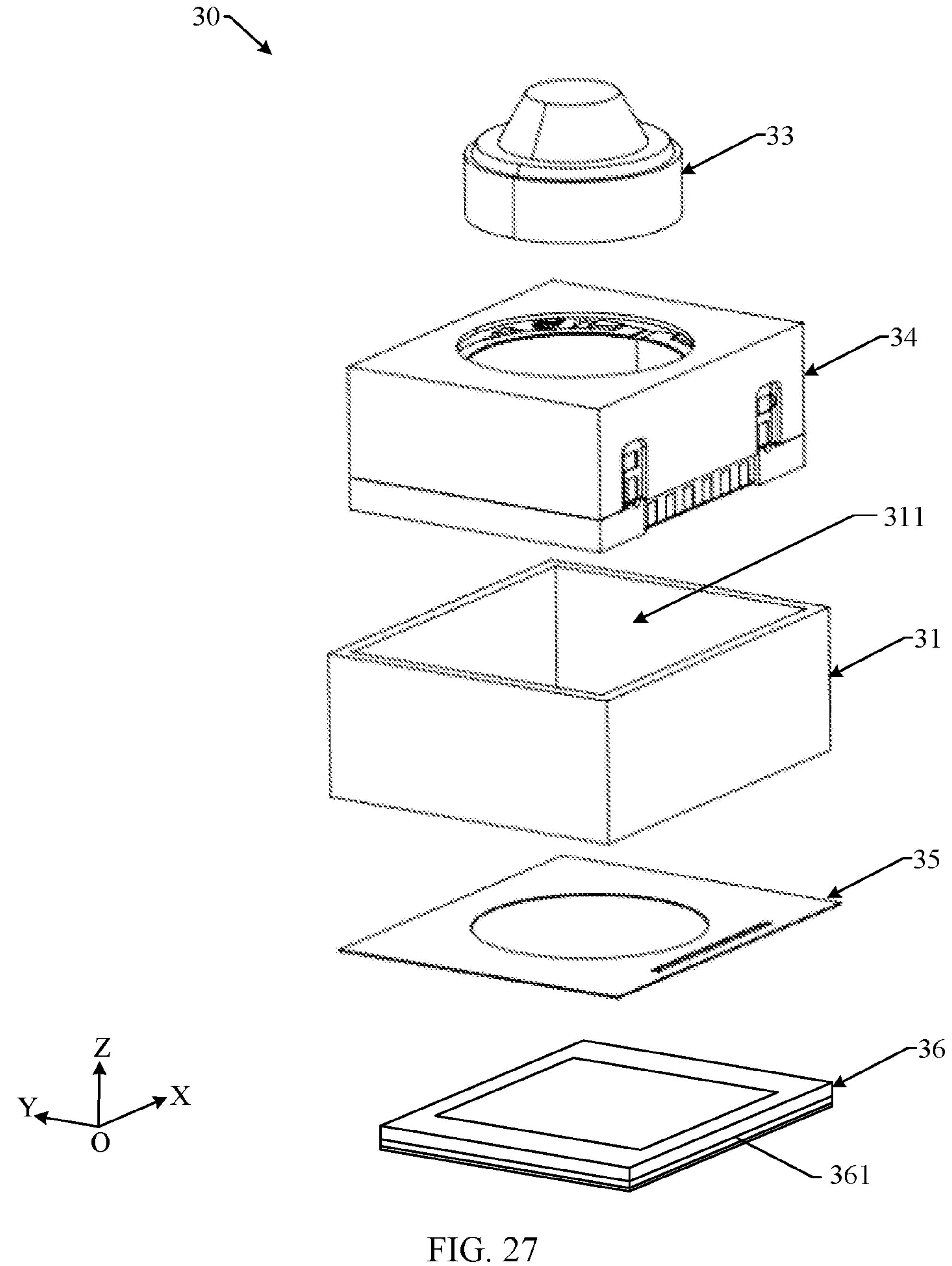
Figure 28:
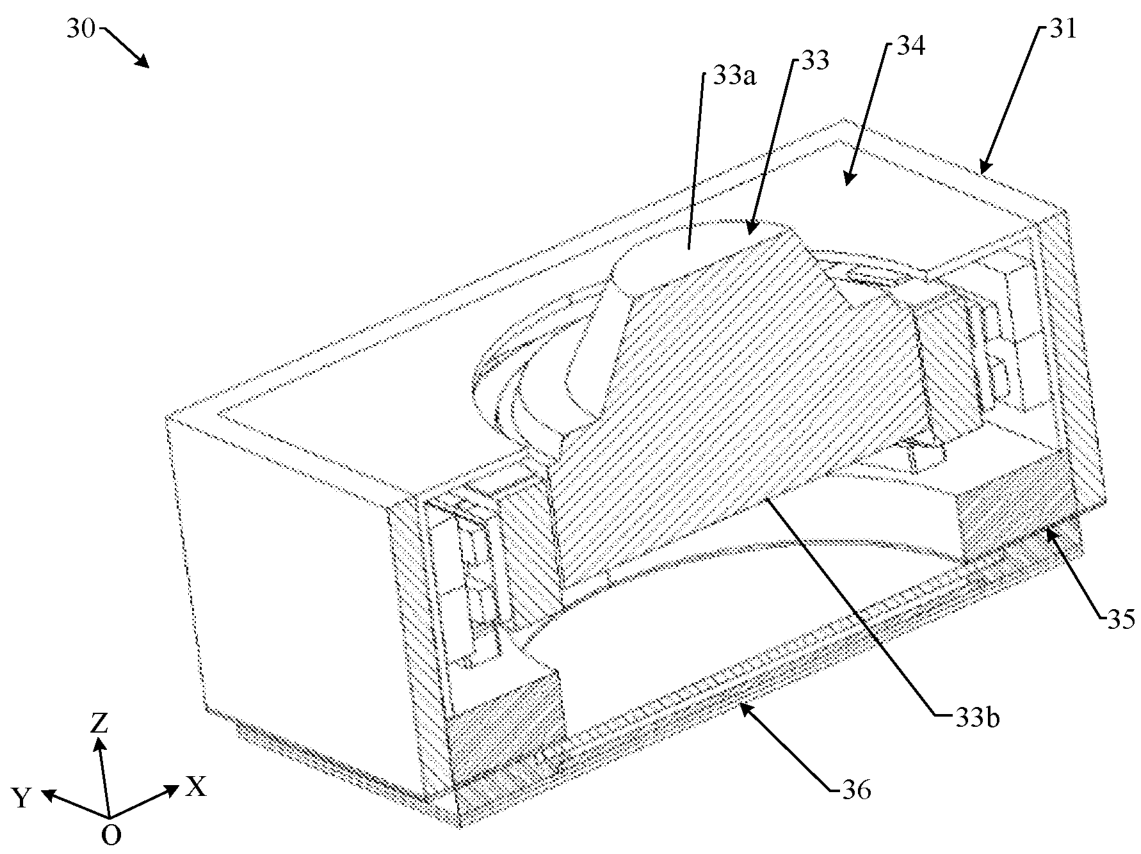
Figure 29:
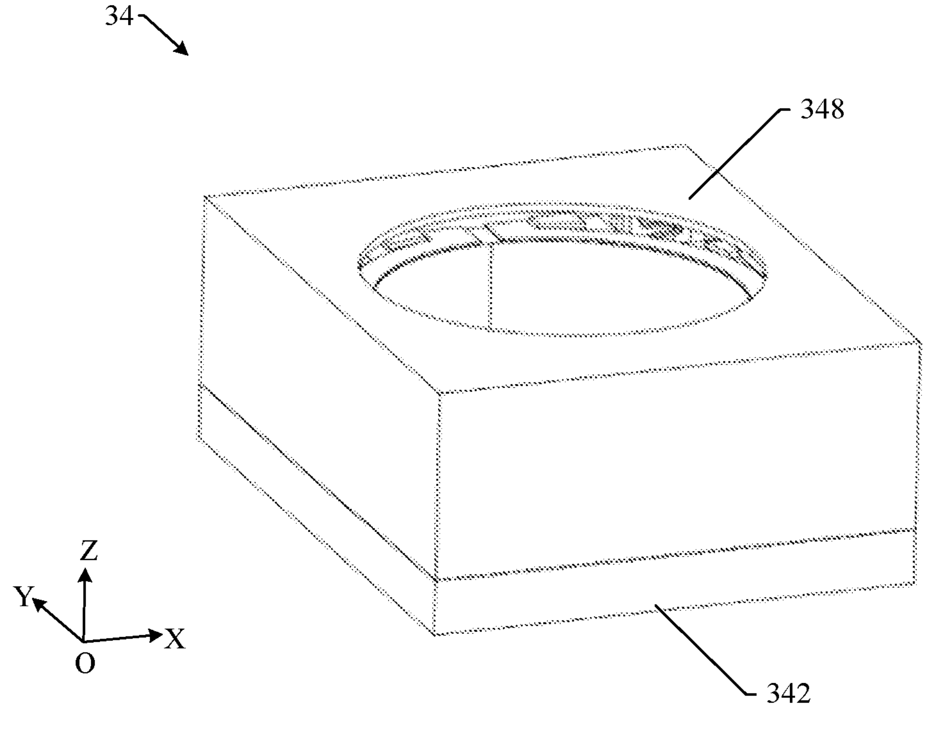
Figure 30:
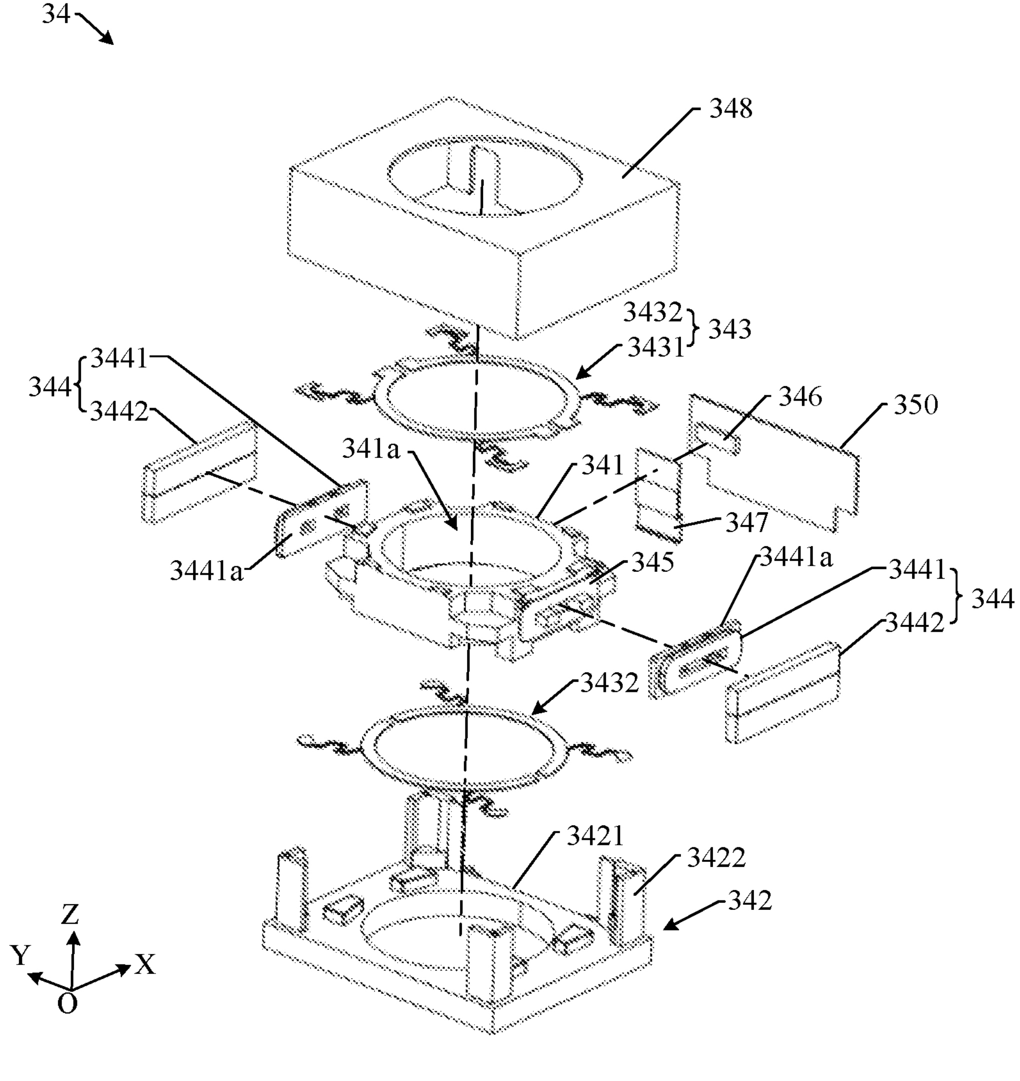
Figure 31:
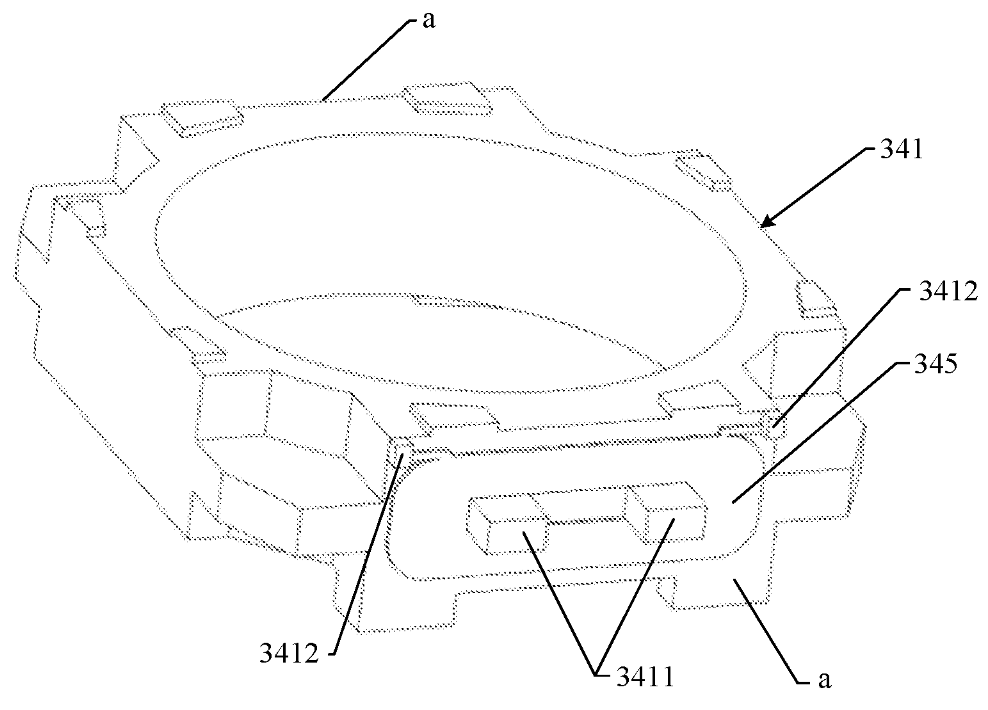
Figure 32:
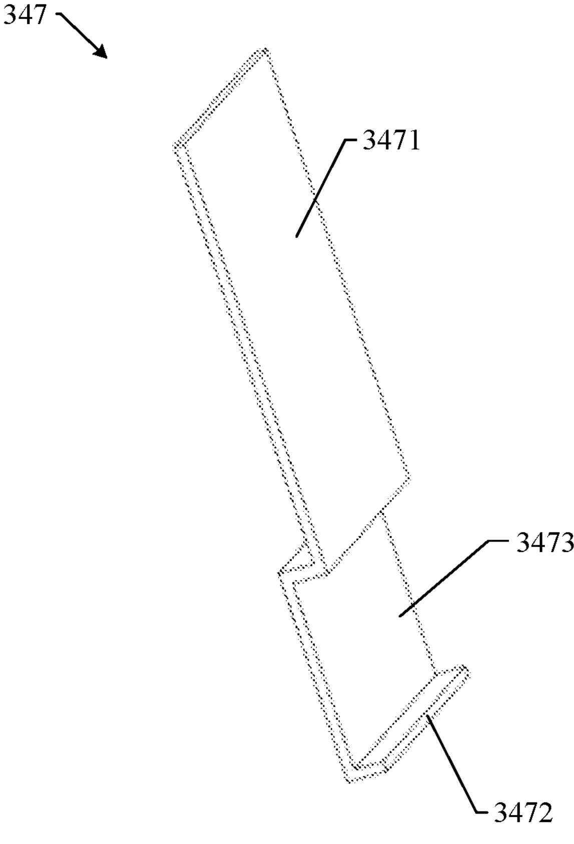
Figure 33:
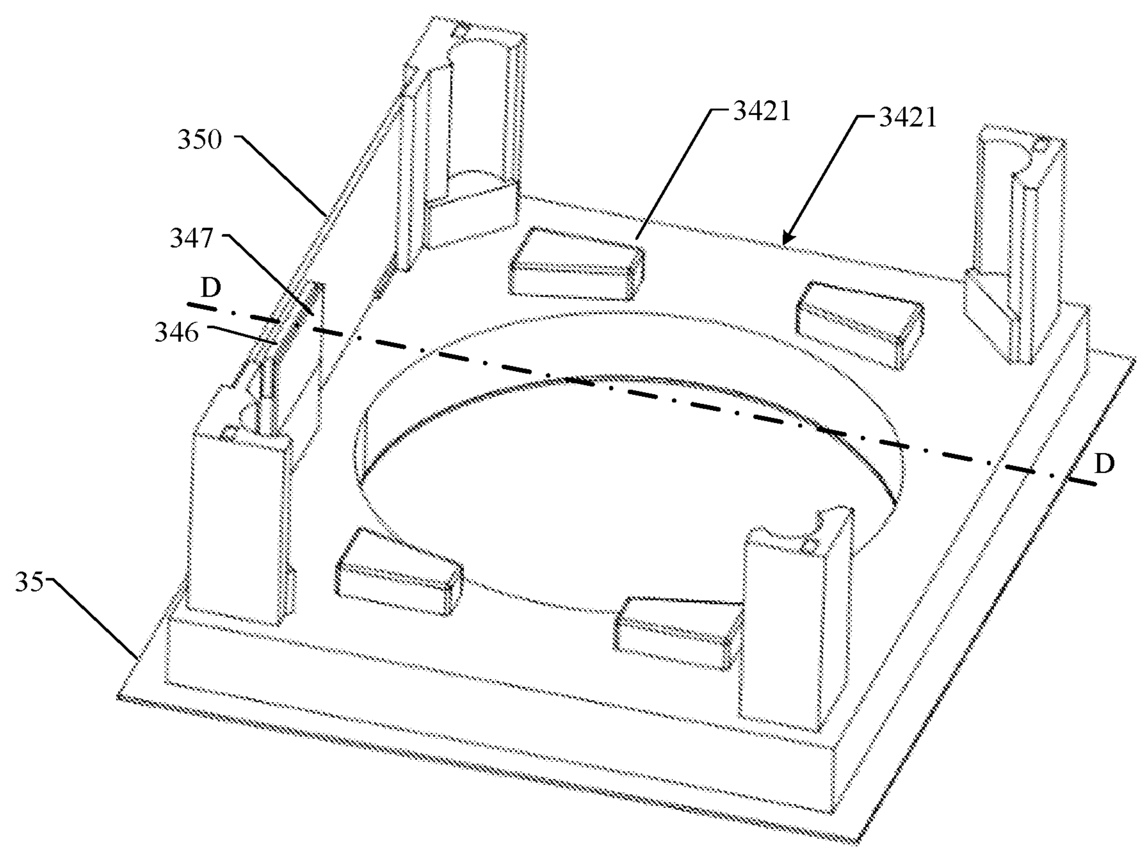
Figure 34:
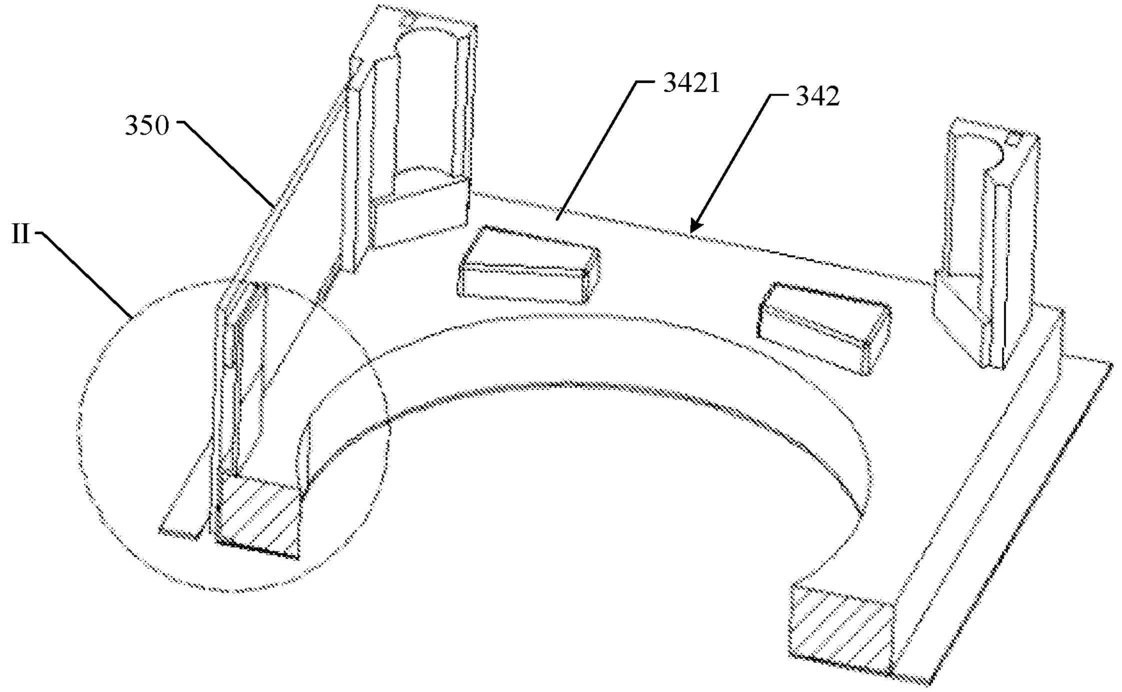
Figure 35:
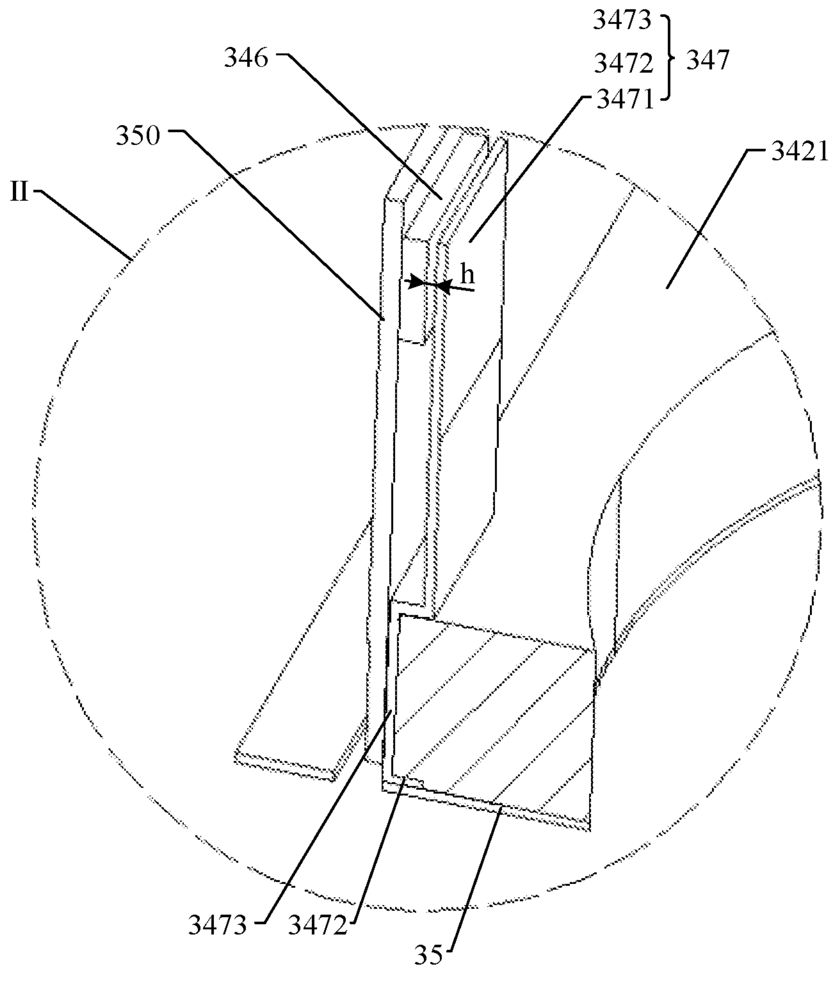
Figure 36:
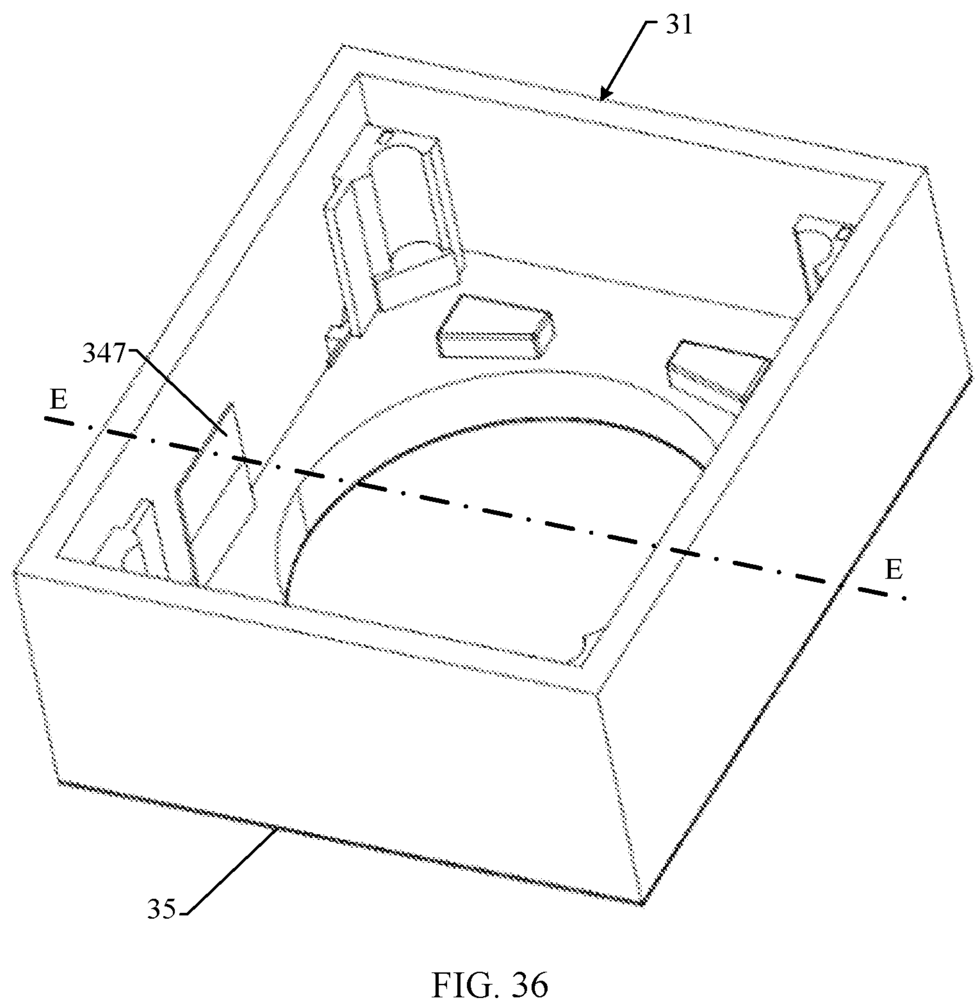
Figure 37:
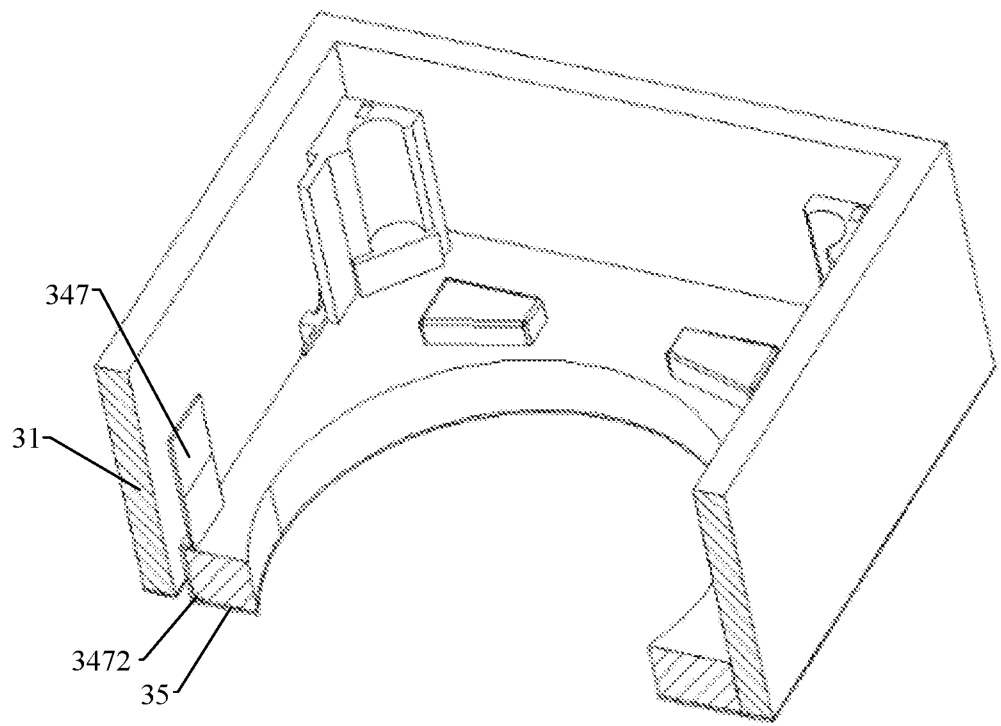

FIG. **15*a* is a schematic diagram of an assembly structure of a carrier, a coil, and a coil heat dissipation structure in the drive motor shown in FIG. 10**;

FIG. **15*b* is an exploded view of the assembly structure shown in FIG. 15*a***;

FIG. 16 is an exploded view of a seat body in the drive motor shown in FIG. 10;

FIG. 17 is an assembly diagram of a seat body, an elastic component, and a coil in the drive motor shown in FIG. 10;

FIG. 18 is an exploded view of a carrier, a detection component, and a drive chip in the drive motor shown in FIG. 10;

FIG. 19 is a schematic structural diagram of a chip heat dissipation structure in the drive motor shown in FIG. 10;

FIG. 20 is a schematic structural diagram of a chip heat dissipation structure according to still some embodiments of this application;

FIG. 21 is an assembly diagram of a seat body, a drive chip, and a chip heat dissipation structure in the drive motor shown in FIG. 10;

FIG. 22 is a three-dimensional cutaway view of the assembly diagram shown in FIG. 21 at a B-B line;

FIG. 23 is an enlarged view of a region I in the cutaway view shown in FIG. 22;

FIG. 24 is a schematic structural diagram of a photosensitive component in the camera module shown in FIG. 4 to FIG. 6;

FIG. 25 is an exploded view of the photosensitive component shown in FIG. 24;

FIG. 26 is a three-dimensional view of a camera module according to still some embodiments of this application;

FIG. 27 is an exploded view of the camera module shown in FIG. 26;

FIG. 28 is a three-dimensional cutaway view of the camera module shown in FIG. 26 at a C-C line;

FIG. 29 is a three-dimensional view of a drive motor in the camera module shown in FIG. 26 to FIG. 28;

FIG. 30 is an exploded view of the drive motor shown in FIG. 29;

FIG. 31 is a schematic diagram of an assembly structure of a carrier and a coil heat dissipation structure in the drive motor shown in FIG. 30;

FIG. 32 is a schematic structural diagram of a chip heat dissipation structure in the drive motor shown in FIG. 30;

FIG. 33 is an assembly diagram of a seat body, a circuit board, a drive chip, a chip heat dissipation structure in the drive motor shown in FIG. 30, and a seat body heat dissipation structure shown in FIG. 27;

FIG. 34 is a three-dimensional cutaway view of the assembly diagram shown in FIG. 33 at a D-D line;

FIG. 35 is an enlarged view of a region II in the cutaway view shown in FIG. 34;

FIG. 36 is an assembly diagram of a seat body and a chip heat dissipation structure in the drive motor shown in FIG. 30, a seat body heat dissipation structure shown in FIG. 27, and a camera support; and FIG. 37 is a three-dimensional cutaway view of the assembly diagram shown in FIG. 36 at an E-E line.

DETAILED DESCRIPTION OF ILLUSTRATIVE EMBODIMENTS

Terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

In embodiments of this application, a term "include" or any other variant thereof is intended to cover a non-exclusive inclusion, so that a process, a method, an article, or an apparatus that includes a series of elements not only includes those elements but also includes other elements that are not expressly listed, or further includes elements inherent to such a process, a method, an article, or an apparatus. An element preceded by "includes a . . . " does not, without more constraints, preclude the existence of additional identical elements in the process, method, article, or apparatus that includes the element.

The term "and/or" in embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

This application provides an electronic device. The electronic device is a type of electronic device having a photographing function. Specifically, the electronic device may be a portable electronic apparatus or another suitable electronic apparatus. For example, the electronic device may be a mobile phone, a tablet personal computer (tablet personal computer), a laptop computer (laptop computer), a personal digital assistant (Personal Digital Assistant, PDA), a camera, a personal computer, a notebook computer, an on-board equipment, a wearable device, augmented reality (Augmented Reality, AR) glasses, an AR helmet, virtual reality (Virtual Reality, VR) glasses, a VR helmet, or the like.

Figure 1:
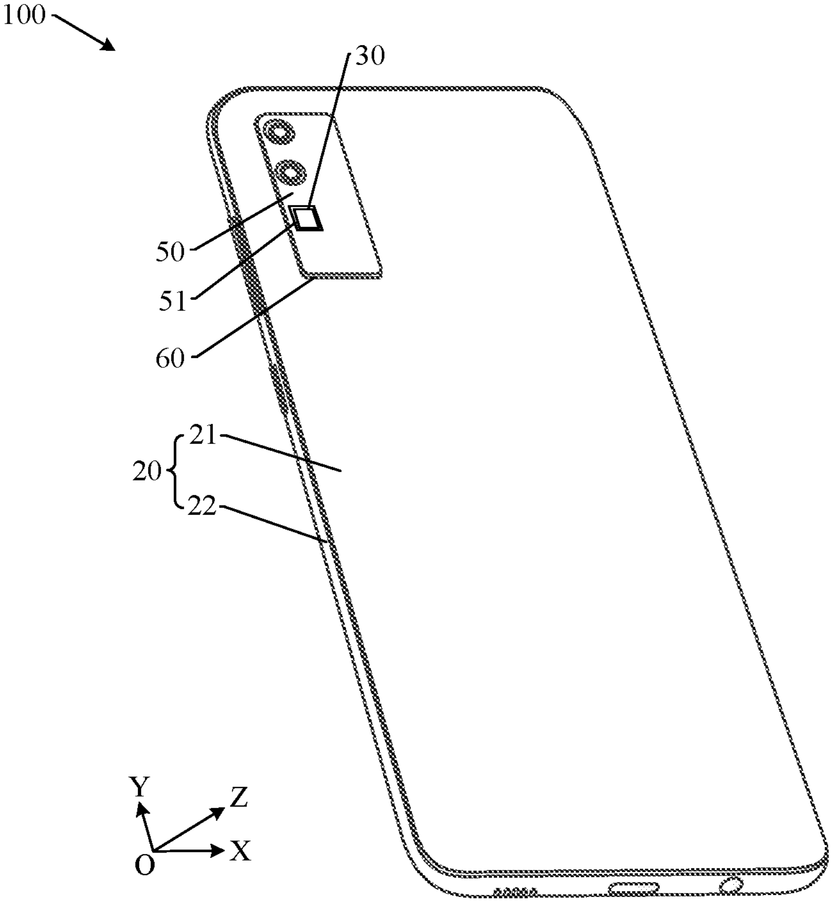
FIG. 1 is a three-dimensional view of an electronic device according to some embodiments of this application.
Figure 2:
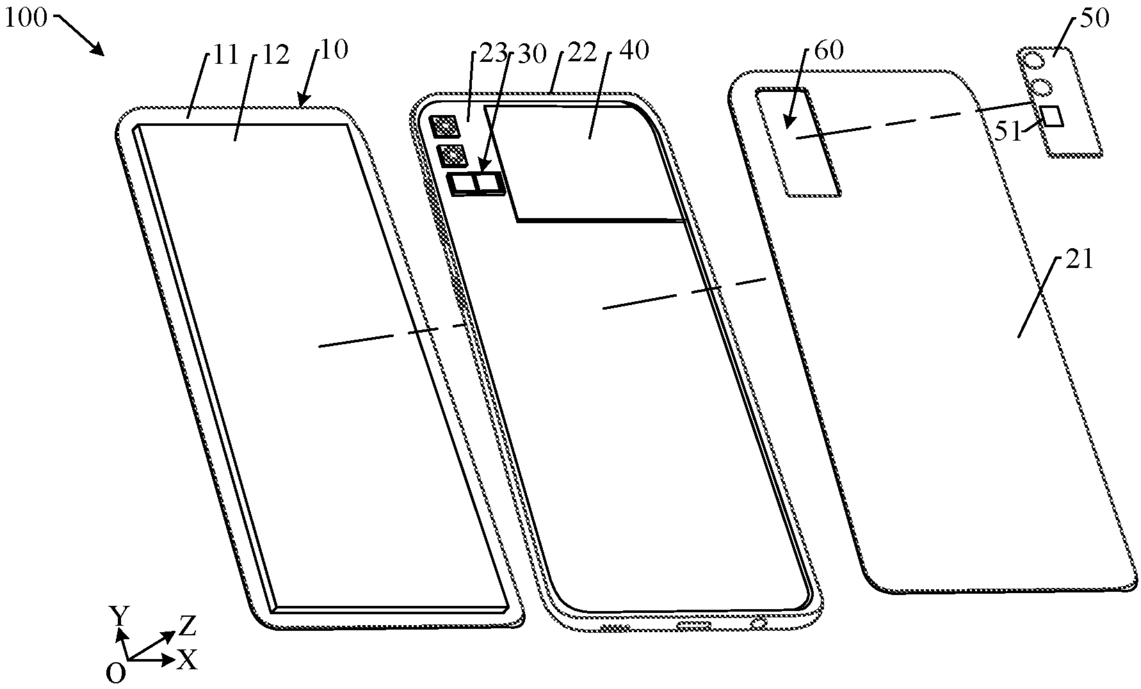
FIG. 2 is an exploded view of the electronic device shown in FIG. 1.

Refer to FIG. 1 and FIG. 2. FIG. 1 is a three-dimensional view of an electronic device 100 according to some embodiments of this application, and FIG. 2 is an exploded view of the electronic device 100 shown in FIG. 1. In the embodiments, the electronic device 100 is a mobile phone. The electronic device 100 includes a screen 10, a rear cover 20, a camera module 30, a main board 40, and a camera decorative cover 50.

It may be understood that FIG. 1 and FIG. 2 schematically show only some components included in the electronic device 100. Actual shapes, actual sizes, actual positions, and actual structures of these components are not limited in FIG. 1 and FIG. 2. In some other examples, the electronic device 100 may alternatively not include the screen 10 and the camera decorative cover 50.

The screen 10 is configured to display an image, a video, and the like. The screen 10 includes a transparent cover 11 and a display 12. The transparent cover 11 and the display 12 are disposed in a stacked manner. The transparent cover 11 is mainly configured to protect the display 12 and prevent the display 12 from dust. A material of the transparent cover 11 includes but is not limited to glass. The display 12 may be a flexible display or a rigid display. For example, the display 12 may be an organic light-emitting diode (Organic Light-Emitting Diode, OLED) display, an active-matrix organic light-emitting diode (Active-Matrix Organic Light-Emitting Diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light emitting diodes (Quantum dot Light Emitting Diodes, QLED) display, or a liquid crystal display (Liquid Crystal Display, LCD).

The rear cover 20 is configured to protect internal electronic components of the electronic device 100. The rear cover 20 includes a back cover 21 and a bezel 22. The back cover 21 is located on a side of the display 12 away from the transparent cover 11, and is disposed in a stacked manner with the transparent cover 11 and the display 12. The bezel 22 is located between the back cover 21 and the transparent cover 11. In addition, the bezel 22 is fastened to the back cover 21. For example, the bezel 22 may be fastened to the back cover 21 through adhesive. Alternatively, the bezel 22 and the back cover 21 may be an all-in-one structure, in other words, the bezel 22 and the back cover 21 are an integral structure. The transparent cover 11 is fastened to the bezel 22 through adhesive. The transparent cover 11, the back cover 21, and the bezel 22 enclose internal accommodation space of the electronic device 100. The display 12 is accommodated in the internal accommodation space.

For ease of description below, an XYZ coordinate system is established. A stacking direction of the transparent cover 11, the display 12, and the back cover 21 in the electronic device 100 (that is, a thickness direction of the electronic device 100) is defined as a Z-axis direction. A plane in which the transparent cover 11, the display 12, or the back cover 21 is located is an XY plane. Specifically, a width direction of the electronic device 100 is an X-axis direction, and a length direction of the electronic device 100 is a Y-axis direction. It may be understood that a coordinate system of the electronic device 100 may be flexibly set based on an actual requirement.

The camera module 30 is configured to take a photo/video. A drive motor is integrated into the camera module 30. The drive motor is configured to implement automatic focusing (Automatic Focusing, AF) and/or optical image stabilization (Optical Image Stabilization, OIS). The camera module 30 is fastened in an internal receptacle of the electronic device 100.

In some embodiments, refer to FIG. 2, and the electronic device 100 further includes a middle plate 23. The middle plate 23 is fastened to an inner surface of the bezel 22 for an entire perimeter. For example, the middle plate 23 may be fastened to the bezel 22 by welding. The middle plate 23 and the bezel 22 may alternatively be an integrated structure. The middle plate 23 is used as a structural "framework" of the electronic device 100. The camera module 30 may be fixed and supported on the middle plate 23 in a manner of thread connection, clamping, welding, and the like. On this basis, optionally, materials of both the middle plate 23 and the bezel 22 are high thermal conduction materials. For example, materials of the middle plate 23 and the bezel 22 include but are not limited to metal such as stainless steel, an aluminum alloy, and a magnesium aluminum alloy. The middle plate 23 is in contact with the bezel 22 with thermal conduction. Heat of the camera module 30 may be conducted to the middle plate 23, and further conducted by the middle plate 23 to the bezel 22. The bezel 22 is in contact with an external air environment of the electronic device 100. Therefore, heat of the bezel 22 may be further dissipated to the external air environment of the electronic device 100. In this way, the camera module 30 can dissipate heat quickly. In addition, structural strength of the metal is usually good, and can ensure support performance of the middle plate 23 and structural strength of the bezel 22.

In some other embodiments, the camera module 30 may be fastened to another thermal conduction structure of the electronic device 100 by thread connection, clamping, welding, and the like. For example, when a material of the back cover 21 or the bezel 22 is a high thermal conduction material such as metal, the camera module 30 may be fastened to the back cover 21 or the bezel 22, to conduct heat to the external air environment of the electronic device 100 by using the back cover 21 or the bezel 22.

The camera module 30 may be used as a rear camera module, or may be used as a front camera module.

In some embodiments, refer to FIG. 2, and the camera module 30 is fastened to a surface of the middle plate 23 close to the back cover 21. A light incident surface of the camera module 30 faces the back cover 21. An installation hole 60 is provided on the back cover 21. The camera decorative cover 50 covers and is fastened to the installation hole 60. The camera decorative cover 50 is configured to protect the camera module 30. In some embodiments, the camera decorative cover 50 protrudes to a side of the back cover 21 away from the transparent cover 11. In this way, the camera decorative cover 50 can increase installation clearance of the camera module 30 in the electronic device 100 along the Z-axis direction. In some other embodiments, the camera decorative cover 50 may alternatively be flush with the back cover 21 or recessed into the internal accommodation space of the electronic device 100. A transparent window 51 is provided on the camera decorative cover 50. The transparent window 51 allows scene light to pass through and be incident to the light incident surface of the camera module 30. In the embodiments, the camera module 30 is used as a rear camera module of the electronic device 100.

In some other embodiments, the camera module 30 is fastened to a surface of the middle plate 23 close to the transparent cover 11. The light incident surface of the camera module 30 faces the transparent cover 11. An optical path avoidance hole is disposed on the display 12. The optical path avoidance hole allows the scene light to be incident to the light incident surface of the camera module 30 after passing through the transparent cover 11. In this way, the camera module 30 is used as a front camera module of the electronic device 100.

The main board 40 is fastened in an internal receptacle of the electronic device 100. For example, the main board 40 may be fastened to the middle plate 23 by thread connection, clamping and the like. When the electronic device 100 does not include the middle plate 23, the main board 40 may alternatively be fastened to a surface of the display 12 close to the back cover 21 by thread connection, clamping and the like.

Figure 3:
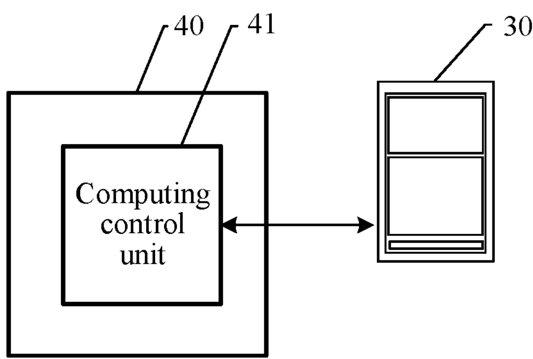
FIG. 3 is an internal circuit diagram of the electronic device shown in FIG. 1 and FIG. 2.

FIG. 3 is an internal circuit diagram of the electronic device 100 shown in FIG. 1 and FIG. 2. The electronic device 100 further includes a computing control unit 41. For example, the computing control unit 41 may be disposed on the main board 40. The computing control unit 41 may alternatively be disposed on another circuit board in the electronic device. For example, the computing control unit 41 may be disposed on a circuit board in which a universal serial bus (Universal Serial Bus, USB) component is located. In some embodiments, the computing control unit 41 is an application processor (Application Processor, AP).

The computing control unit 41 is electrically connected to the camera module 30. The computing control unit 41 is configured to receive and process an electrical signal containing image information from the camera module 30. The computing control unit 41 is further configured to control the drive motor of the camera module 30 to move, to implement AF moving and/or OIS moving.

The camera module 30 may be a periscope camera module, or may be a vertical camera module.

Refer to FIG. 4 to FIG. 6. FIG. 4 is a three-dimensional view of the camera module 30 in the electronic device 100 shown in FIG. 1 and FIG. 2, FIG. 5 is an exploded view of the camera module 30 shown in FIG. 4, and FIG. 6 is a three-dimensional cutaway view of the camera module 30 shown in FIG. 4 at an A-A line. In the embodiments, the camera module 30 is a periscope camera module. Specifically, the camera module 30 includes a camera support 31, an optical path turning element 32, an optical lens 33, a drive motor 34, a seat body heat dissipation structure 35, and a photosensitive component 36.

It may be understood that FIG. 4 to FIG. 6 show only some components included in the camera module 30 when the camera module 30 is a periscope camera module. Actual shapes, actual sizes, actual positions, and actual structures of these components are not limited by FIG. 4 to FIG. 6. In some other examples, the camera module 30 may alternatively not include the camera support 31 and the seat body heat dissipation structure 35.

The camera support 31 is configured to connect the optical path turning element 32, the optical lens 33, the drive motor 34, and the photosensitive component 36 as a whole, and fasten the whole in the electronic device 100 shown in FIG. 1 and FIG. 2. A material of the camera support 31 includes but is not limited to metal and plastic. In some embodiments, the material of the camera support 31 is metal. For example, the material of the camera support 31 includes but is not limited to an aluminum alloy or a magnesium aluminum alloy. The metal structure has good strength, and can ensure support strength of the camera support 31. In addition, the metal has good thermal conduction performance, and can effectively conduct heat generated by the drive motor 34 and the photosensitive component 36 to a structure (for example, the middle plate 23) that is in the electronic device 100 and that is configured to support the camera module 30.

Figure 7:
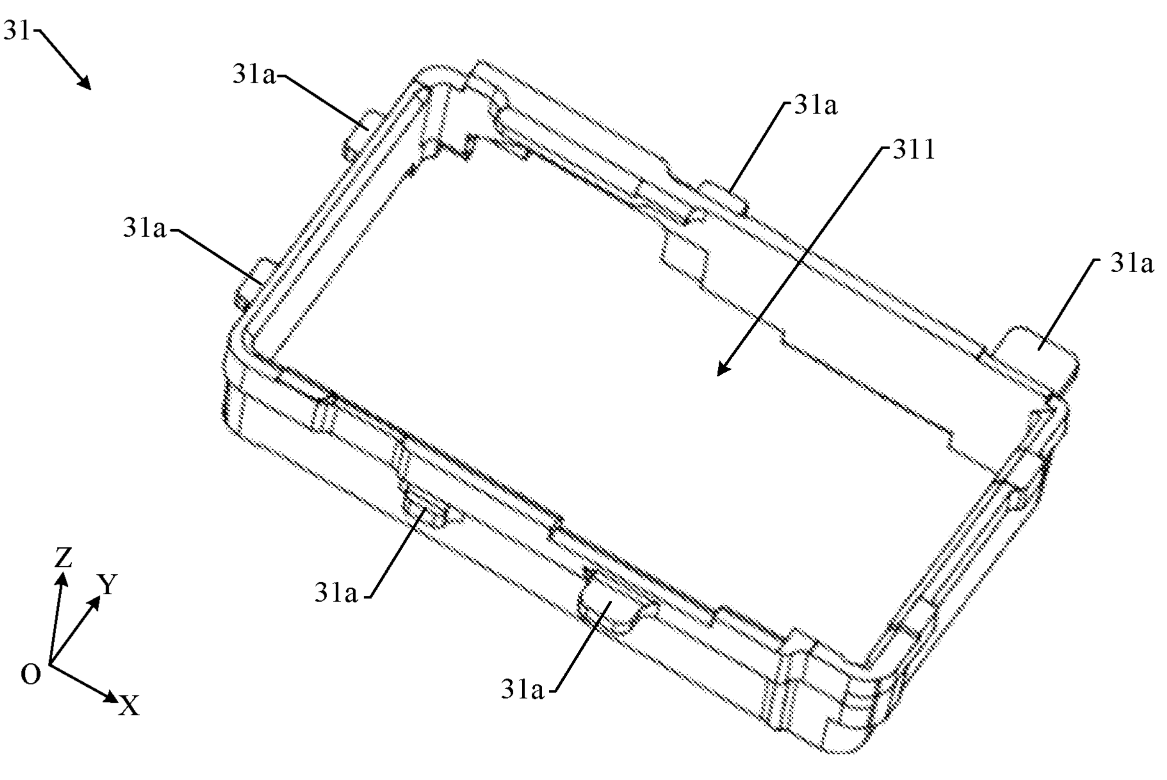
FIG. 7 is a three-dimensional view of a camera support in the camera module shown in FIG. 4 to FIG. 6.

In some embodiments, refer to FIG. 7, and FIG. 7 is a three-dimensional view of the camera support 31 in the camera module 30 shown in FIG. 4 to FIG. 6. A connector 31*a* is disposed on an outer wall of the camera support 31. In some embodiments, the connector 31*a* is a buckle. In other embodiments, the connector 31*a* is an engaging lug. The camera support 31 is fastened in the electronic device 100 shown in FIG. 1 and FIG. 2 by using a connector 31*a*.

An inner hole 311 is provided in the camera support 31. Refer to FIG. 4 to FIG. 6. The optical path turning element 32, the optical lens 33, the drive motor 34, and the photosensitive component 36 are installed in the inner hole 311. The optical lens 33 is installed in the drive motor 34. The optical path turning element 32, the drive motor 34, and the photosensitive component 36 may be fastened to the camera support 31 by adhesive, clamping, thread connection, and the like. In this way, the camera support 31 connects the optical path turning element 32, the optical lens 33, the drive motor 34, and the photosensitive component 36 as a whole, and fasten the whole in the electronic device 100 shown in FIG. 1 and FIG. 2 by using the buckle 31*a*.

Continue to refer to FIG. 4 to FIG. 6. In the inner hole 311 of the camera support 31, the optical path turning element 32, the drive motor 34 with the optical lens 33, and the photosensitive component 36 are sequentially arranged in a direction parallel to an XY plane. For example, the optical path turning element 32, the drive motor 34 with the optical lens 33, and the photosensitive component 36 are sequentially arranged in an X-axis direction.

Refer to FIG. 6. Scene light L is incident to the optical path turning element 32 in a Z-axis direction (that is, a first direction) from the transparent window 51 in FIG. 2. Further, under action of the optical path turning element 32, a transmission path of the scene light Lis turned. The scene light L is transmitted in an arrangement direction of the optical path turning element 32, the drive motor 34 with the optical lens 33, and the photosensitive component 36 (the X-axis direction, that is, a second direction), and is successively incident to the optical lens 33 and the photosensitive component 36. The drive motor 34 drives the optical lens 33 to move in the arrangement direction of the optical path turning element 32, the drive motor 34 with the optical lens 33, and the photosensitive component 36, so that an automatic focusing function of the camera module 30 can be implemented. A focusing limit distance under the automatic focusing function does not affect a thickness of the electronic device 100 in the Z-axis direction. Therefore, the focusing limit distance may be designed to be large. In this way, the camera module 30 may be used as a long-focus camera module, to implement a long-focus photographing function of the electronic device 100. Certainly, in other embodiments, the camera module 30 may alternatively be used as a primary camera module of the electronic device 100.

The optical path turning element 32 is configured to change the transmission path of the scene light L, so that the scene light L incident in the Z-axis direction (the first direction) is emitted in the X-axis direction (the second direction). For example, the optical path turning element 32 may be a right-angle prism. Two right-angle surfaces of the right-angle prism are respectively used as a light incident surface and an out-light surface. An oblique surface of the right-angle prism is a reflective surface. The reflection surface is configured to change the transmission path of the scene light L in a reflective manner. The optical path turning element 32 may alternatively be a planar reflection mirror.

The optical lens 33 is configured to image a photographed scene. The optical lens 33 is a periscope lens. A direction of an optical axis of the periscope lens is consistent with the arrangement direction of the optical path turning element 32, the drive motor 34 with the optical lens 33, and the photosensitive component 36.

Figure 8:
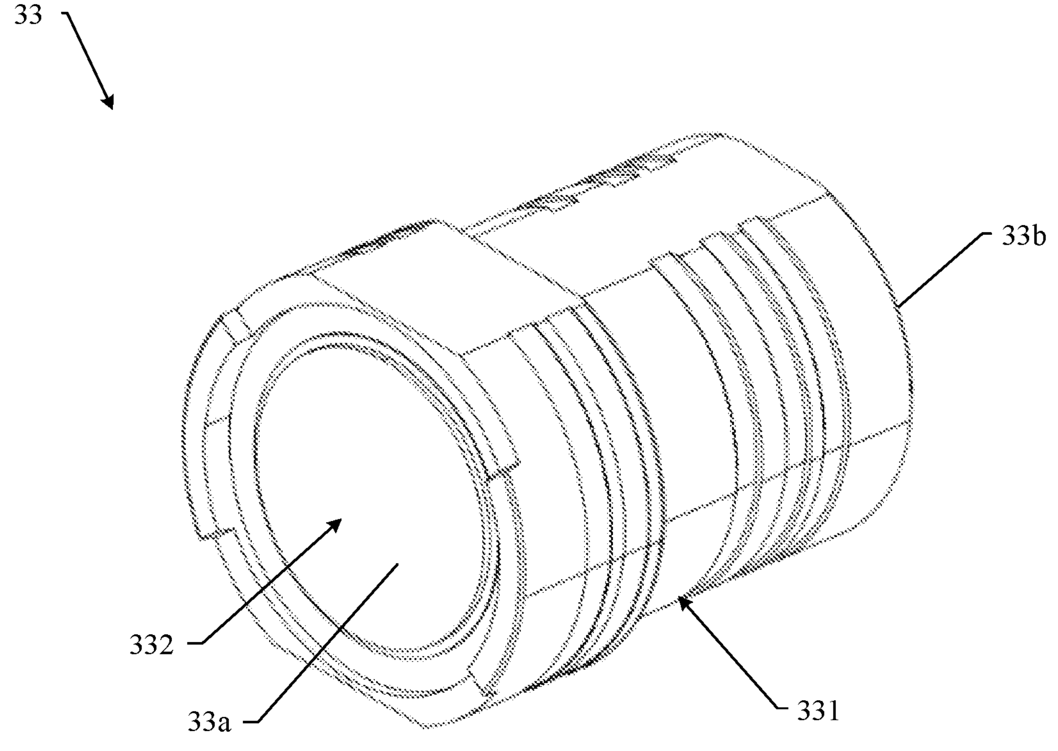
FIG. 8 is a schematic structural diagram of an optical lens in the camera module shown in FIG. 5.

FIG. 8 is a schematic structural diagram of the optical lens 33 in the camera module 30 shown in FIG. 5. The optical lens 33 includes a lens tube 331 and an optical lens group 332. The lens tube 331 is configured to fix and protect the optical lens group 332. The lens tube 331 has a cylindrical structure. In other words, both ends of the lens tube 331 are opened in an optical axis direction. The optical lens group 332 is installed in the lens tube 331. The optical lens group 332 includes at least one optical lens. When the optical lens group 332 includes a plurality of optical lenses, the plurality of optical lenses are disposed in a stacked manner in the optical axis direction.

Alternatively, the optical lens 33 may include only the optical lens group 332. The optical lens group 332 is installed in the drive motor 34. In this way, the optical lens group 332 is fixed and protected by using the drive motor 34. In this way, the drive motor 34 is integrated with the optical lens 33. This helps reduce a volume of the camera module 30.

An optical lens having different features such as a standard focus and a long focus can be obtained by designing a structural composition of the optical lens group 332 and a shape and a size of each optical lens.

Continue to refer to FIG. 8. The optical lens 33 includes a light incident surface 33*a* and an out-light surface 33*b*. The light incident surface 33*a* is a surface facing the optical path turning element 32 when the optical lens 33 is in use. In other words, the optical path turning element 32 is located on a light incident side of the optical lens 33. The light incident side of the optical lens 33 is a side of the light incident surface 33*a* away from the out-light surface 33*b*. The out-light surface of the optical path turning element 32 is opposite to the light input surface 33*a* of the optical lens 33. After the scene light Lis emitted from the optical path turning element 32, the object light L is incident to the optical lens 33 by using the light incident surface 33*a*. The out-light surface 33*b* of the optical lens 33 is a surface opposite to the optical path turning element 32 when the optical lens 33 is in use. The scene light L is emitted from the out-light surface 33*b*.

Figure 9:
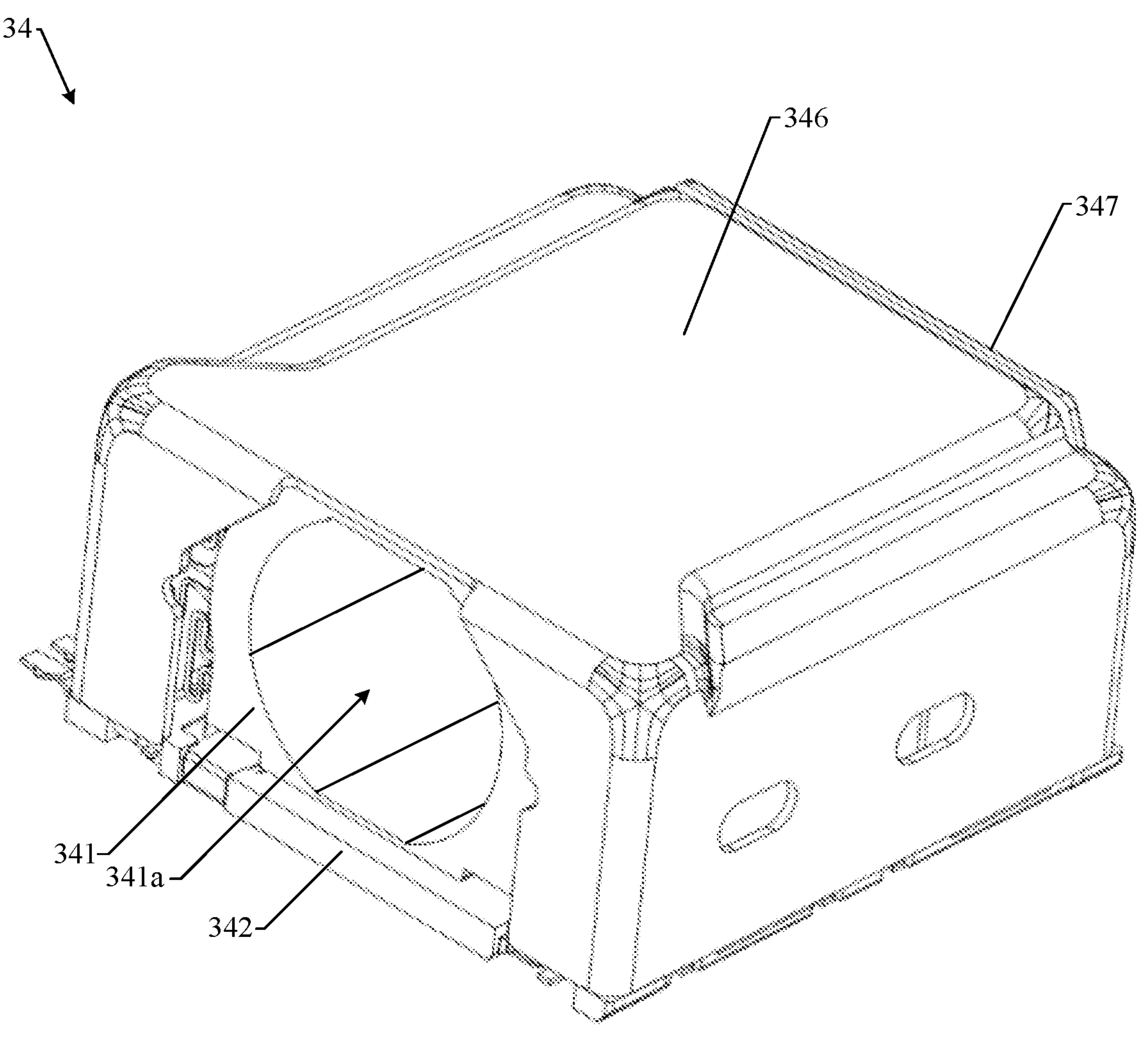
FIG. 9 is a three-dimensional view of a drive motor in the camera module shown in FIG. 5.

Refer to FIG. 9 and FIG. 10. FIG. 9 is a three-dimensional view of the drive motor 34 in the camera module 30 shown in FIG. 5. FIG. 10 is an exploded view of the drive motor 34 shown in FIG. 9. The drive motor 34 includes a carrier 341, a seat body 342, an elastic component 343, a drive component 344, a drive chip 346, a housing 348, and an optical path sealing kit 349.

It may be understood that FIG. 9 and FIG. 10 schematically show only some components included in the drive motor 34. Actual shapes, actual sizes, actual positions, and actual structures of these components are not limited in FIG. 9 and FIG. 10. In some embodiments, the drive motor 34 may alternatively not include the housing 348 and the optical path sealing kit 349.

Figure 11:
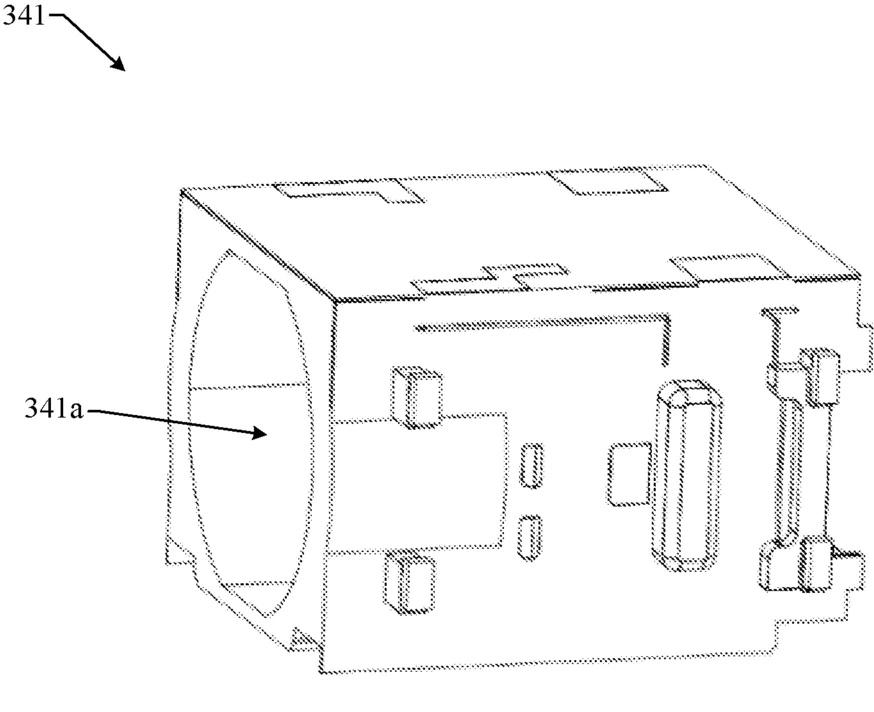
FIG. 11 is a schematic structural diagram of a carrier in the drive motor shown in FIG. 10.

FIG. 11 is a schematic structural diagram of the carrier 341 in the drive motor 34 shown in FIG. 10. A lens installation hole 341*a* is provided in the carrier 341. Both ends of the lens installation hole 341*a* are opened in an axial direction of the lens installation hole 341*a*. The optical lens 33 shown in FIG. 8 is installed in the lens installation hole 341*a*. In some embodiments, the optical lens 33 is installed in the lens installation hole 341*a* in a detachable manner such as clamping or thread connection, to facilitate replacement of the optical lens 33. In some other embodiments, the optical lens 33 may alternatively be installed in the lens installation hole 341*a* in a non-detachable manner such as adhesive or welding. When the optical lens 33 is installed in the lens installation hole 341*a*, an extension direction of an optical axis of the optical lens 33 is consistent with an axial direction of the lens installation hole 341*a*.

A forming material of the carrier 341 includes but is not limited to metal and plastic. In some embodiments, the forming material of the carrier 341 is plastic. For example, the material of the carrier 341 is a liquid crystal polymer (Liquid Crystal Polymer, LCP).

Figure 12:
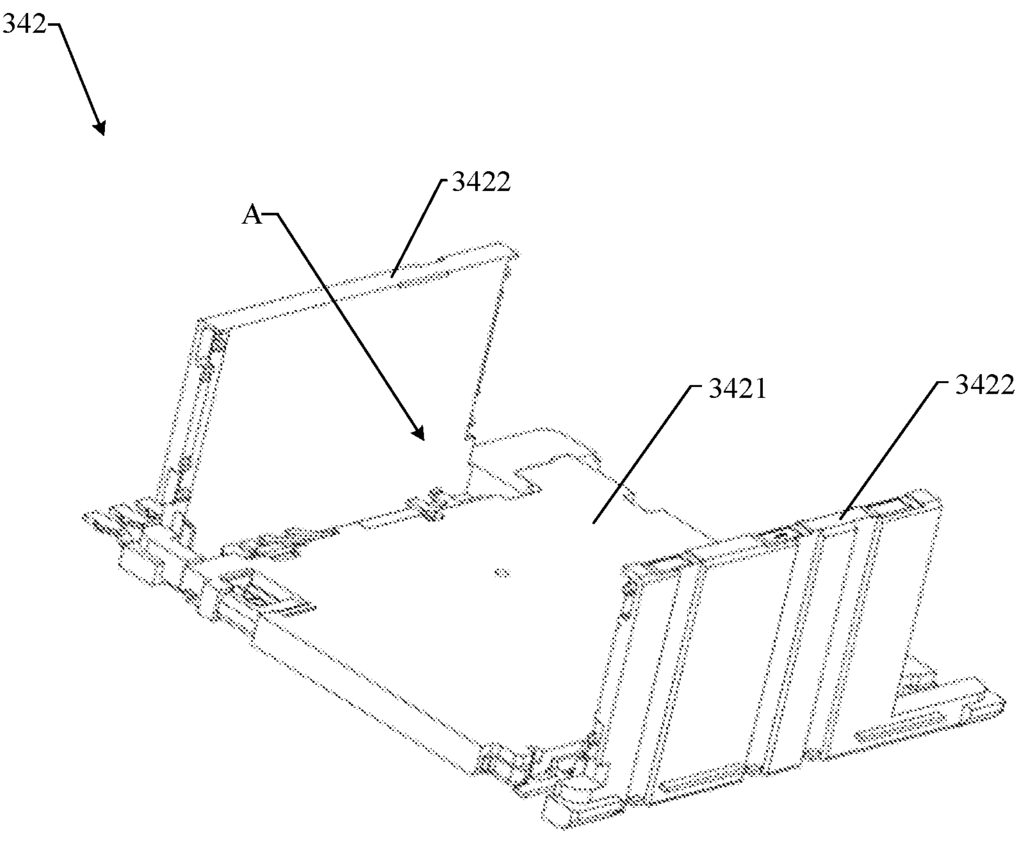
FIG. 12 is a schematic structural diagram of a seat body in the drive motor shown in FIG. 10.

FIG. 12 is a schematic structural diagram of the seat body 342 in the drive motor 34 shown in FIG. 10. A forming material of the seat body 342 includes but is not limited to metal and plastic. In some embodiments, the forming material of the seat body 342 is plastic. For example, the material of the seat body 342 is a liquid crystal polymer (Liquid Crystal Polymer, LCP). The seat body 342 includes a substrate portion 3421 and a support portion 3422. In some embodiments, there are two support portions 3422. The two support portions 3422 are respectively fastened to two opposite edges of the substrate portion 3421. Optionally, the two support portions 3422 are perpendicular or approximately perpendicular to the substrate portion 3421. The substrate portion 3421 and the two support portions 3422 form an accommodating groove A. The carrier 341 is accommodated in the accommodating groove A.

Figure 13:
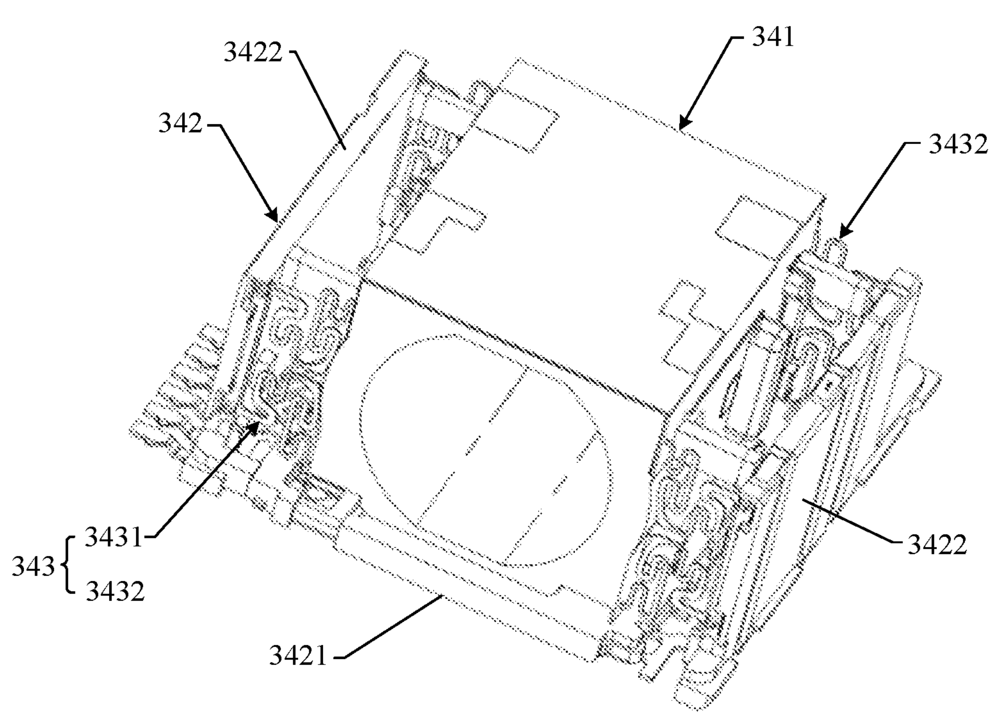
FIG. 13 is an assembly diagram of a carrier, a seat body, and an elastic component in the drive motor shown in FIG. 10.

FIG. 13 is an assembly diagram of the carrier 341, the seat body 342, and the elastic component 343 in the drive motor 34 shown in FIG. 10. The elastic component 343 is connected between the carrier 341 and the seat body 342. The elastic component 343 is configured to elastically support the carrier 341 on the seat body 342. In some embodiments, the elastic component 343 includes a first elastic component 3431 and a second elastic component 3432. The first elastic component 3431 and the second elastic component 3432 include but are not limited to spring plates and coil springs. In this application, only an example in which the first elastic component 3431 and the second elastic component 3432 are spring plates is used for description. This cannot be considered as a special limitation on this application.

The first elastic component 3431 is connected between the seat body 342 and an end of the carrier 341 close to the optical path turning element 32. The second elastic component 3432 is connected between the seat body 342 and an end of the carrier 341 away from the optical path turning element 32. In this way, the end of the carrier 341 close to the optical path turning element 32 is elastically supported on the seat body 342 by using the first elastic component 3431. In addition, the end of the carrier 341 away from the optical path turning element 32 is elastically supported on the seat body 342 by using the second elastic component 3432. That the carrier 341 tilts relative to the seat body 342 under action of a sole weight and load (including a weight of the optical lens 33) can be avoided. In this way, support stability of the carrier 341 on the seat body 342 can be improved.

Figure 14:
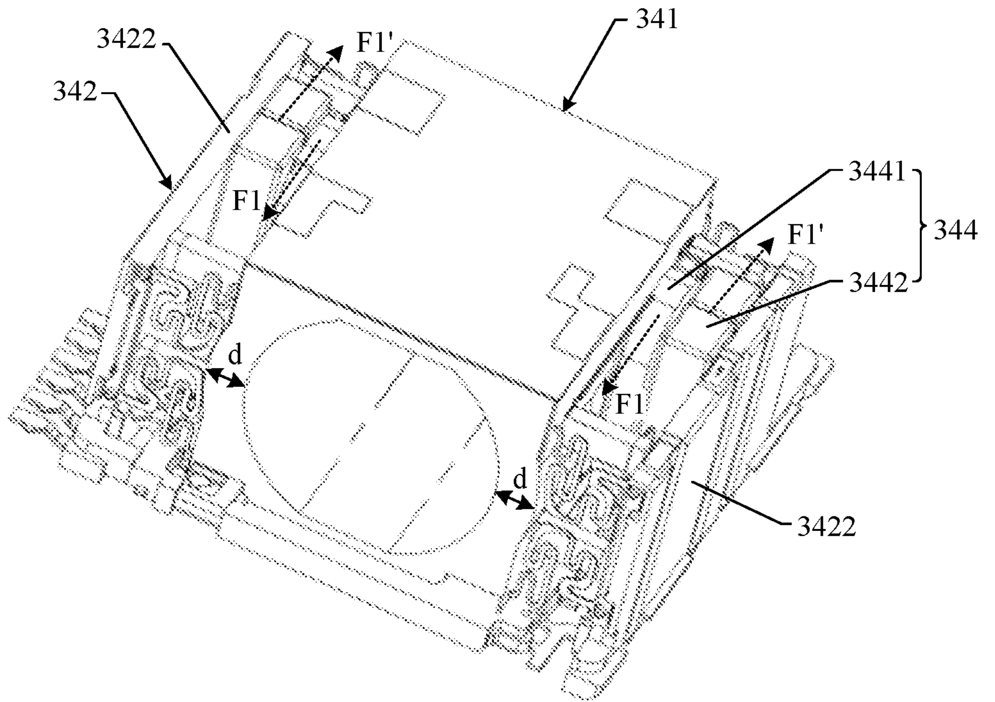
FIG. 14 is an assembly diagram of a carrier, a seat body, an elastic component, and a drive component in the drive motor shown in FIG. 10.

FIG. 14 is an assembly diagram of the carrier 341, the seat body 342, the elastic component 343, and the drive component 344 in the drive motor 34 shown in FIG. 10. The drive component 344 is disposed between the carrier 341 and the seat body 342. Specifically, the drive component 344 is disposed between the carrier 341 and the support portion 3422. The drive component 344 is configured to drive the carrier 341 and the optical lens 33 to move together in the optical axis direction of the optical lens 33, to implement automatic focusing.

In some embodiments, continue to refer to FIG. 14, and the drive component 344 includes a coil 3441 and a magnet 3442. The coil 3441 is installed on an outer surface of the carrier 341. The outer surface of the carrier 341 is a surface in the outer surface of the carrier 341 axially parallel to or approximately parallel to the lens installation hole 341*a*. The magnet 3442 is installed on the seat body 342. For example, the magnet 3442 is fastened to the support portion 3422. In other embodiments, the coil 3441 may alternatively be installed on the seat body 342, and the magnet 3442 may alternatively be installed on the outer surface of the carrier 341. The following uses only an example in which the coil 3441 is installed on the outer surface of the carrier 341 and the magnet 3442 is installed on the seat body 342 for description. This cannot be considered as a special limitation on this application.

The coil 3441 is opposite to the magnet 3442. In other words, the orthographic projection of the coil 3441 on the magnet 3442 overlaps with the magnet 3442. When the coil 3441 is powered on, under action of the magnetic field of the magnet 3442, interaction forces (ampere forces) F1 and F1' in the optical axis direction of the optical lens 33 are generated between the coil 3441 and the magnet 3442. Under the interaction forces, the carrier 341 and the optical lens 33 may be driven to move in the optical axis direction of the optical lens 33 relative to the seat body 342, to implement automatic focusing.

To ensure drive stability of the drive component 344, in some embodiments, continue to refer to FIG. 14, and there are two coils 3441 and two magnets 3442. The two coils 3441 are respectively located on two opposite sides of the carrier 341. The two magnets 3442 are respectively opposite to the two coils 3441. In this way, two pairs of interaction forces F1 and F1' are generated through the two magnets 3442 and the two coils 3441. The two pairs of interaction forces F1 and F1' are respectively located on two opposite sides of the carrier 341. Therefore, drive stability of the drive component 344 can be ensured.

With development of photography and image shooting technologies of the electronic device, the camera module 30 has an increasingly high requirement on an ultimate focusing distance, and there are an increasing quantity of scenarios in which a user uses a large stroke. A large-stroke focusing distance is usually 2.5 cm or greater. To implement large-stroke focusing drive, a quantity of turns of a winding wire in the coil 3441 increases, and a current increases. Volumes of the coil 3441 and the magnet 3442 are large. In this way, heat generated by the coil 3441 increases. In addition, an overall volume of the camera module 30 cannot be increased due to limited installation clearance of the camera module 30 in the electronic device. Therefore, a wall thickness d of the carrier 341 may be reduced (refer to FIG. 14), so that a part of installation clearance is reserved for the drive component 344. However, in this case, a distance between the coil 3441 and the lens installation hole 341*a* is short. The heat generated by the coil 3441 is easily conducted to the optical lens 33 in the lens installation hole 341*a*, to affect optical performance of the optical lens 33. In addition, a material of lens in the optical lens is usually polyethylene terephthalate (Polyethylene Terephthalate, PET). The material is temperature-sensitive. A linear expansion coefficient is about 0.07% o/° C. Therefore, in a case of being heated, the optical lens is prone to expand. In terms of optical performance of the optical lens, an effective focal length (Effective Focal Length, EFL) variation rate is on an order of magnitude of μm/° ° C. In addition, in a circumferential direction of the optical lens 33, the coil 3441 is distributed in local positions. Therefore, in the circumferential direction of the optical lens 33, temperature rises at different positions of the optical lens are inconsistent, and thermal expansion degrees are different. Consequently, aberration of the optical lens 33 changes sharply, and photographing quality of the camera module 30 seriously deteriorates.

To reduce impact of the heat generated by the coil 3441 on the optical lens 33, refer to FIG. 10, and the drive motor 34 further includes a coil heat dissipation structure 345. The coil heat dissipation structure 345 is a high thermal conduction structure. It should be noted that, in the embodiments and the following embodiments, the high thermal conduction structure refers to a structure formed by a material whose thermal conductivity is 80 w/m·k or greater. Specifically, a material of the coil heat dissipation structure 345 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like.

Figure 15B:
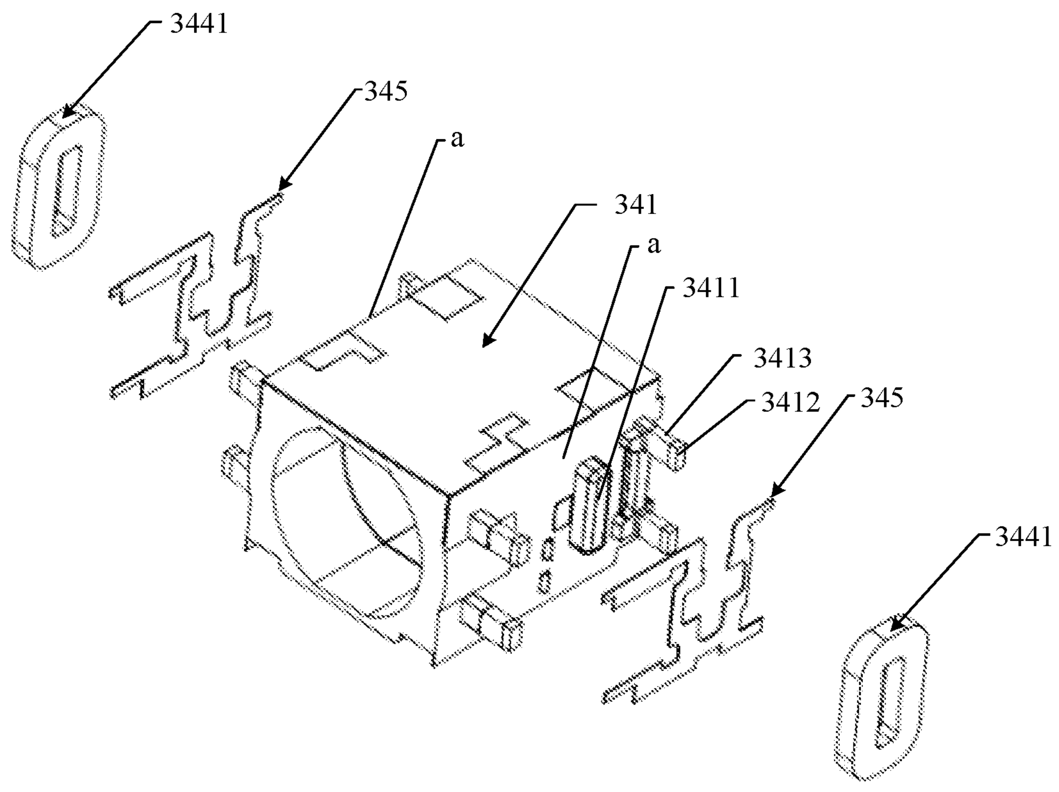

Refer to FIG. 15*a* and FIG. 15*b*. FIG. 15*a* is a schematic diagram of an assembly structure of the carrier 341, the coil 3441, and the coil heat dissipation structure 345 in the drive motor 34 shown in FIG. 10. FIG. 15*b* is an exploded view of the assembly structure shown in FIG. 15*a*. In the embodiments, the coil heat dissipation structure 345 is located between the coil 3441 and the carrier 341. When there are two coils 3441, there are also two coil heat dissipation structures 345. The two coil heat dissipation structures 345 are respectively located between the two coils 3441 and the carrier 341.

The coil heat dissipation structure 345 is fastened to the carrier 341. Specifically, the coil heat dissipation structure 345 may be fastened to the carrier 341 by adhesive, or may be formed as a whole with the carrier 341 by using a process such as insert molding (insert molding), thermal spraying, or electro chemical deposition. In other words, the coil heat dissipation structure 345 and the carrier 341 are a whole structure.

The coil 3441 is fastened to the coil heat dissipation structure 345 with thermal conduction. It should be noted that, in the embodiments and the following embodiments, "fastened with thermal conduction" means the two are fastened and in thermal conduction with each other. The coil 3441 may be directly fastened to the coil heat dissipation structure 345 by adhesive, and the like. Alternatively, the coil 3441 may be indirectly fastened to the coil heat dissipation structure 345. For example, refer to FIG. 15*a* and FIG. 15*b*, and the coil heat dissipation structure 345 is fastened to the carrier 341, and a fastening post 3411 is fastened to the carrier 341. The coil 3441 is wound and fastened to the fastening post 3411. Therefore, the coil 3441 is indirectly fastened to the coil heat dissipation structure 345 by using the fastening post 3411 and the carrier 341.

The coil 3441 and the coil heat dissipation structure 345 may be in direct contact for thermal conduction, or may conduct heat indirectly by using another intermediate structure. This is not specifically limited herein. In some embodiments, refer to FIG. 15*a* and FIG. 15*b*, and the coil 3441 is in direct contact with the coil heat dissipation structure 345 for thermal conduction. Thermal conduction efficiency of direct contact thermal conduction is high, and the coil heat dissipation structure 345 can quickly absorb heat of the coil 3441.

In some embodiments, the coil heat dissipation structure 345 includes a metal layer and a graphite layer that are disposed in a stacked manner. The metal layer is in contact with the coil 3441, and the graphite layer is located on a side of the metal layer close to the carrier 341. Both the metal layer and the graphite layer have high thermal conductivity coefficients. Therefore, the heat of the coil 3441 can be quickly absorbed. A difference lies in that the metal layer has good thermal conduction performance in any direction, while the graphite layer has thermal conduction directivity. Specifically, the graphite layer has good thermal conduction performance in a plane in which the graphite layer is located, and has poor thermal conduction performance in a direction perpendicular to the plane in which the graphite layer is located. The reason is that molecules of the graphite layer have a network structure in the plane in which the graphite layer is located, connection tightness between the molecules is good, and the thermal conduction performance is good. However, the molecules in the direction perpendicular to the plane in which the molecules are located are superimposed layer by layer, and the connection tightness between two adjacent layers of molecules is poor; and therefore the thermal conduction performance is poor. In this way, the graphite layer can prevent the heat generated by the coil 3441 from being conducted to a side close to the lens installation hole 341*a*.

An orthographic projection area of the coil 3441 on a first surface a of the carrier 341 is less than an orthographic projection area of the coil heat dissipation structure 345 on the first surface a of the carrier 341. The first surface a is a surface that is on the carrier 341 and that is configured to install the coil 3441. In this way, the coil heat dissipation structure 345 may disperse heat of the coil 3441 to a large region of a side wall of the carrier 341, to avoid heat concentration. In this way, impact of the heat generated when the coil 3441 works on the optical lens 33 can be reduced.

To implement long-focus drive of the optical lens 33, a volume of the drive component 344 is usually large, and a width of a gap between the carrier 341 and the seat body 342 at the drive component 344 is large. As a result, the carrier 341 easily tilts relative to the seat body 342 during an AF moving process. To avoid this problem, continue to refer to FIG. 15*a* and FIG. 15*b*, and an uprighting column 3413 is disposed on the carrier 341. The uprighting column 3413 is configured to hold the carrier 341 upright, to avoid that the carrier 341 tilts relative to the seat body 342 during the AF moving process. In some embodiments, there are a plurality of uprighting columns 3413. For example, there are eight uprighting columns 3413, and the eight uprighting columns 3413 are distributed on two sides of the carrier 341 for installing the coil 3441.

Further, a damping adhesive 3412 is disposed on the uprighting column 3413. The uprighting column 3413 is in contact with two support portions 3422 of the seat body 342 in FIG. 12 by using the damping adhesive 3412. In this way, impact wear caused by collision between the uprighting column 3413 and the seat body 342 during the AF moving process can be reduced. In the embodiments, it may be considered that the damping adhesive 3412 is indirectly disposed on the carrier 341 by using the uprighting column 3413.

On the basis of the foregoing embodiments, to further reduce impact of the heat generated by the coil 3441 on optical performance of the optical lens 33, in some embodiments, the damping adhesive 3412 is a high thermal conduction structure. Specifically, the damping adhesive 3412 is at least one of silicon gel and acrylate rubber. The coil heat dissipation structure 345 is in thermal conduction with the damping adhesive 3412. In other words, thermal conduction can be performed between the coil heat dissipation structure 345 and the damping adhesive 3412. In this way, the heat of the coil 3441 may be conducted to the damping adhesive 3412, and further conducted to the seat body 342 by using the damping adhesive 3412. To some extent, conduction of the heat of the coil 3441 to the optical lens 33 can be avoided. Therefore, the impact of the heat generated by the coil 3441 on the optical lens 33 can be further reduced.

In the foregoing embodiments, specifically, the coil heat dissipation structure 345 may extend to a position of the damping adhesive 3412, to be in direct contact with the damping adhesive 3412 for thermal conduction, or may indirectly perform thermal conduction with the damping adhesive 3412 by using another intermediate structure. For example, continue to refer to FIG. 15*a* and FIG. 15*b*, and the coil heat dissipation structure 345 extends to a position of the uprighting column 3413, and is in contact with the uprighting column 3413 for thermal conduction. The uprighting column 3413 is in contact with the damping adhesive 3412 for thermal conduction. In this way, the coil heat dissipation structure 345 performs indirect thermal conduction with the damping adhesive 3412 by using the uprighting column 3413.

Refer to FIG. 10. The drive chip 346 is fastened to the seat body 342. Specifically, the drive chip 346 may be fastened to the seat body 342 by adhesive dispensing, welding, or insert molding (insert molding) and the like. The drive chip 346 is opposite to a bottom surface of the carrier 341.

The drive chip 346 is electrically connected to the coil 3441. Specifically, refer to FIG. 16, and FIG. 16 is an exploded view of the seat body 342 in the drive motor 34 shown in FIG. 10. The drive motor 34 further includes a conductive connection structure 3423. In some embodiments, the conductive connection structure 3423 includes a plurality of metal conductors disposed on a same plane. The plurality of metal conductors are embedded in the substrate portion 3421. In another embodiment, the conductive connection structure 3423 may alternatively be a flexible circuit board (Flexible Printed Circuit, FPC) fastened to the substrate portion 3421. The drive chip 346 is electrically connected to the conductive connection structure 3423.

On the basis of the foregoing embodiments, FIG. 17 is an assembly diagram of the seat body 342, the elastic component 343, and the coil 3441 in the drive motor 34 shown in FIG. 10. The elastic component 343 is made of a metal conductive material. The drive chip 346 is electrically connected to the first elastic component 3431 and the second elastic component 3432 by using the conductive connection structure 3423. Further, the drive chip 346 is electrically connected to one electrode of the two coils 3441 by using the first elastic component 3431 and two conductive wires b, and electrically connected to the other electrode of the two coils 3441 by using the second elastic component 3432 and two conductive wires c. In this way, the drive chip 346 is electrically connected to the coil 3441.

The drive chip 346 is further electrically connected to a circuit board 361 of the photosensitive component 36 in FIG. 6. Specifically, the drive chip 346 is electrically connected to the circuit board 361 of the photosensitive component 36 in FIG. 6 by using the conductive connection structure 3423.

The circuit board 361 is configured to transmit a power supply signal and a control signal that are sent by the computing control unit 41 in FIG. 3 to the drive chip 346. The drive chip 346 is configured to determine, based on the power supply signal and the control signal, a magnitude of a current output to the two coils 3441 and current output time. In addition, the drive component 344 is controlled to drive the carrier 341 to move based on the magnitude of the output current and the time of the output current, to implement automatic focusing drive.

In some embodiments, the drive motor 34 further includes a detection component. The detection component is electrically connected to the circuit board 361 of the photosensitive component 36 in FIG. 6. In some embodiments, the detection component is electrically connected to the circuit board 361 of the photosensitive component 36 in FIG. 6 by using the conductive connection structure 3423. The detection component is configured to detect a moving distance of the carrier 341 relative to the seat body 342. A detection signal of the detection component is fed back to the computing control unit 41 by using the circuit board 361. The computing control unit 41 controls, based on the detection signal, the drive chip 346 to drive the carrier 341 to move relative to the seat body 342, to implement closed-loop control of the drive motor 34.

For example, FIG. 18 is an exploded view of the carrier 341, the detection component, and the drive chip 346 in the drive motor 34 shown in FIG. 10. The detection component includes a magnet 341*b* and a Hall effect sensor (not shown in the figure). The magnet 341*b* is fastened to the carrier 341. The Hall effect sensor is integrated on the drive chip 346. The Hall effect sensor is opposite to the magnet 341*b*. When the magnet 341*b* moves with the carrier 341, the Hall effect sensor can detect a moving distance of the carrier 341 by sensing a change of a magnetic field. In the embodiments, the Hall effect sensor may communicate with the circuit board 361 by using a signal line of the drive chip 346. In other embodiments, the drive motor 34 may not include the detection component.

As an ultimate focusing distance of the camera module 30 increases, heat generated by the drive chip 346 also increases, and the heat generated by the drive chip 346 reaches 140° C. Limited by an overall volume of the camera module 30, a distance between the drive chip 346 and the optical lens 33 is short. Therefore, the heat of the drive chip 346 may also be easily conducted to the optical lens 33, thereby affecting optical performance of the optical lens 33.

To reduce impact of the heat generated by the drive chip 346 on the optical lens 33, refer to FIG. 10, and the drive motor 34 further includes a chip heat dissipation structure 347. The chip heat dissipation structure 347 is a high thermal conduction structure. Specifically, a material of the chip heat dissipation structure 347 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like.

FIG. 19 is a schematic structural diagram of a chip heat dissipation structure 347 in the drive motor 34 shown in FIG. 10. The chip heat dissipation structure 347 includes a first part 3471 and a second part 3472 that are fastened together with thermal conduction. Specifically, the first part 3471 and the second part 3472 may be directly fastened, or may be indirectly fastened by using another structure, or may be directly in contact for thermal conduction, or may indirectly conduct heat by using another intermediate structure. This is not specifically limited herein. In some embodiments, the chip heat dissipation structure 347 further includes a third part 3473. The third part 3473 is connected between the first part 3471 and the second part 3472. The first part 3471 and the second part 3472 are indirectly fastened by using the third part 3473 with thermal conduction. In some embodiments, the first part 3471, the second part 3472, and the third part 3473 are integrally formed. In other words, the first part 3471, the second part 3472, and the third part 3473 are a whole structural part. In the embodiments, the chip heat dissipation structure 347 is approximately C-shaped. In other embodiments, FIG. 20 is a schematic structural diagram of a chip heat dissipation structure 347 according to still some embodiments of this application. In the embodiments, the chip heat dissipation structure 347 is approximately S-shaped.

Refer to FIG. 21, FIG. 22, and FIG. 23. FIG. 21 is an assembly diagram of the seat body 342, the drive chip 346, and the chip heat dissipation structure 347 in the drive motor 34 shown in FIG. 10. FIG. 22 is a three-dimensional cutaway view of the assembly diagram shown in FIG. 21 at a B-B line. FIG. 23 is an enlarged view of a region I in the cutaway view shown in FIG. 22. The chip heat dissipation structure 347 is fastened to the seat body 342. Specifically, the chip heat dissipation structure 347 may be fastened to the substrate portion 3421 of the seat body 342 by adhesive dispensing, insert molding (insert molding), welding, and the like. The first part 3471 is located on a side of the drive chip 346 close to the carrier 341 in FIG. 10, and the first part 3471 is in thermal conduction with the drive chip 346. In other words, heat can be transmitted between the first part 3471 and the drive chip 346. Therefore, the first part 3471 can absorb the heat of the drive chip 346. The first part 3471 may be in a block shape, a sheet shape, and the like. This is not specifically limited herein. In some embodiments, the first part 3471 is in a sheet shape. In this way, the first part 3471 occupies small space in the drive motor 34. In some embodiments, a projection of the drive chip 346 on the first part 3471 in a direction close to the carrier 341 is located in the first part 3471. In this way, the first part 3471 can shield the drive chip 346, to absorb the heat generated by the drive chip 346 during a working process to a large extent.

On the basis of the foregoing embodiments, the first part 3471 may be made of a metal material as a whole, or may be made of a combination of a metal material and a non-metal material. This is not specifically limited herein. In some embodiments, the first part 3471 includes a metal layer and a graphite layer that are disposed in a stacked manner. In the Z-axis direction, the first part 3471 includes a metal layer and a graphite layer that are disposed in a stacked manner, where the graphite layer is close to the bottom of the carrier 341 in FIG. 10. Both the metal layer and the graphite layer have high thermal conductivity coefficients. Therefore, the heat of the drive chip 346 can be quickly absorbed. In addition, the graphite layer can prevent the heat generated by the drive chip 346 from being transmitted to a side close to the carrier 341, thereby further reducing impact of the heat generated by the drive chip 346 on the optical lens 33 in the carrier 341. A material of the metal layer includes but is not limited to copper and a copper alloy. In addition, the graphite layer may be formed on the metal layer by electro chemical deposition, spraying, and the like. This is not specifically limited herein.

To enable the first part 3471 to absorb the heat of the drive chip 346 to a large extent, in some embodiments, refer to FIG. 23, and a groove B is provided on a surface of the substrate portion 3421 of the seat body 342 close to the carrier 341 in FIG. 10. The drive chip 346 is accommodated in the groove B. For example, the drive chip 346 is fastened to a bottom surface of the groove B. The first part 3471 covers and is fastened to an opening of the groove B. In this way, heat radiated by the drive chip 346 to a side close to the carrier 341 is transmitted to the first part 3471 in a centralized manner under limitation of the groove B. In this way, the first part 3471 can absorb the heat of the drive chip 346 to a large extent.

The first part 3471 may be in direct contact with the drive chip 346 for thermal conduction, or may be spaced apart with the drive chip 346 to implement heat transmission in a manner of heat radiation. This is not specifically limited herein. In some embodiments, refer to FIG. 23, and the first part 3471 and the drive chip 346 are spaced apart. A gap width h between the first part 3471 and the drive chip 346 is greater than 0 mm and is less than or equal to 1 mm. Optionally, the gap width h between the first part 3471 and the drive chip 346 is equal to 0.05 mm/0.2 mm/0.5 mm. In this way, a distance between the first part 3471 and the drive chip 346 is moderate, and the heat of the drive chip 346 can be transmitted to the first part 3471 to a large extent. In addition, when the first part 3471 is made of a conductive material such as metal, impact of the first part 3471 on electrical performance of the drive chip 346 can be avoided, thereby ensuring reliability of the drive chip 346.

The second part 3472 is fastened to the seat body 342 with thermal conduction. Specifically, the second part 3472 and the seat body 342 may be directly fastened, or may be indirectly fastened by using another structure, or may be directly in contact for thermal conduction, or may indirectly conduct heat by using another intermediate structure. This is not specifically limited herein. In this way, the heat absorbed by the first part 3471 may be conducted to the seat body 342 by using the third part 3473 and the second part 3472, to avoid transmission of the heat of the drive chip 346 to the carrier 341.

In some embodiments, the second part 3472 is located on a side of the substrate portion 3421 of the seat body 342 away from the carrier 341 in FIG. 10, and the second part 3472 is in contact with and fastened to a surface of the substrate portion 3421 away from the carrier 341. In this way, the heat absorbed by the first part 3471 can be conducted, by using the third part 3473 and the second part 3472, to a surface of the substrate portion 3421 away from the carrier 341 in FIG. 10, to avoid heat transmission to the direction close to the carrier 341. In this way, impact of the heat generated by the drive chip 346 on the optical lens 33 is reduced.

In some embodiments, the second part 3472 and the third part 3473 are alternatively in a sheet shape. In addition, the second part 3472 and the third part 3473 also include a metal layer and a graphite layer that are disposed in a stacked manner. The metal layer of the third part 3473 is connected between a metal layer of the first part 3471 and a metal layer of the second part 3472. In some embodiments, the metal layer of the first part 3471, the metal layer of the second part 3472, and the metal layer of the third part 3473 are integrally formed. The graphite layer of the third part 3473 is connected between a graphite layer of the first part 3471 and a graphite layer of the second part 3472. In some embodiments, the graphite layer of the first part 3471, the graphite layer of the second part 3472, and the graphite layer of the third part 3473 are integrally formed. In this way, heat of the first part 3471 can be effectively conducted to the second part 3472, and the chip heat dissipation structure 347 has a simple composition structure and is easy to manufacture.

Refer to FIG. 10. The housing 348 is fastened to the substrate portion 3421 of the seat body 342. The carrier 341, the elastic component 343, the drive component 344, the drive chip 346, the optical path sealing kit 349, and the support portion 3422 of the seat body 342 are all located in the housing 348. The housing 348 is configured to protect a structure installed inside the housing 348 from dust. Materials of the housing 348 include but are not limited to plastic and metal.

The optical path sealing kit 349 is located on a side of the carrier 341 close to the photosensitive component 36 in FIG. 5. The optical path sealing kit 349 is fastened to the seat body 342. The optical path sealing kit 349 is configured to seal an optical path between the housing 348 and the photosensitive component 36, to avoid that an external noise enters an imaging optical path from a gap between the housing 348 and the photosensitive component 36. It should be noted that a structure of the optical path sealing kit 349 is the same as that of an optical path sealing kit in a periscope camera module in a conventional technology. Details are not described herein.

Refer to FIG. 24 and FIG. 25. FIG. 24 is a schematic structural diagram of a photosensitive component 36 in the camera module 30 shown in FIG. 4 to FIG. 6. FIG. 25 is an exploded view of the photosensitive component 36 shown in FIG. 24. The photosensitive component 36 includes a circuit board 361, an image sensor 362, a light filter 363, and a support 364.

It may be understood that FIG. 24 and FIG. 25 schematically show only some components included in the photosensitive component 36, and actual shapes, actual sizes, actual positions, and actual structures of these components are not limited by FIG. 24 and FIG. 25. In some other examples, the photosensitive component 36 may alternatively not include the light filter 363 and the support 364.

The circuit board 361 may be a rigid circuit board, or may be a flexible circuit board, or may be a rigid-flex circuit board. The circuit board 361 may be an FR-4 dielectric board, or may be a Rogers (Rogers) dielectric board, or may be a Rogers and FR-4 hybrid dielectric board, or the like.

In some embodiments, the seat body heat dissipation structure 35 in FIG. 5 is further in contact with the circuit board 361 for thermal conduction. In this way, heat of the circuit board 361 may be conducted to the seat body heat dissipation structure 35, and the heat is further conducted, by using the seat body heat dissipation structure 35, to the camera support 31 and a structure (for example, the middle plate 23) that is in the electronic device 100 and that is configured to support the camera module 30.

The camera module 30 is electrically connected to the computing control unit 41 in FIG. 3 by using the circuit board 361, to implement communication with the computing control unit 41.

The image sensor 362 may also be referred to as a photosensitive chip, or may also be referred to as a photosensitive component. The image sensor 362 is disposed on the circuit board 361. A photosensitive surface of the image sensor 362 is opposite to an out-light surface 31*b* of the optical lens 31 shown in FIG. 8. The image sensor 362 is configured to collect scene light passing through the optical lens 31, and convert image information carried in the scene light into an electrical signal.

The light filter 363 is located between the photosensitive surface of the image sensor 362 and the out-light surface 31*b* of the optical lens 31. In addition, the light filter 363 is fastened to the circuit board 361 by using the support 364. Specifically, the support 364 is fastened to the circuit board 361 by adhesive, clamping, thread connection, and the like, and the light filter 363 is fastened to the support 364 by adhesive, clamping, thread connection, and the like.

The light filter 363 may be configured to filter out stray light of the scene light that passes through the optical lens 31, to ensure that an image photographed by the camera module 30 has a good definition. The light filter 363 includes but is not limited to a blue glass light filter. For example, the light filter 363 may alternatively be a reflective infrared filter or a dual-bandpass filter. The dual-bandpass filter may enable both visible light and infrared light in the scene light to pass through, or enable both the visible light and light of another specific wavelength (for example, ultraviolet light) in the scene light to pass through, or enable both the infrared light and the light of another specific wavelength (for example, ultraviolet light) to pass through.

Refer to FIG. 4 to FIG. 6. The seat body heat dissipation structure 35 is a high thermal conduction structure. Specifically, a material of the seat body heat dissipation structure 35 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like. The seat body heat dissipation structure 35 is fastened between the seat body 342 of the drive motor 34 and the camera support 31 with thermal conduction. In other words, the seat body heat dissipation structure 35 is fastened between the seat body 342 and the camera support 31, the seat body heat dissipation structure 35 is in thermal conduction with the seat body 342, and the seat body heat dissipation structure 35 is in thermal conduction with the seat body 342. In this way, the seat body heat dissipation structure 35 can conduct heat of the seat body 342 to the camera support 31, and further use the camera support 31 to conduct the heat to a structure (for example, the middle plate 23) that is in the electronic device 100 and that is configured to support the camera module 30.

In some embodiments, refer to FIG. 4 to FIG. 6, and the seat body heat dissipation structure 35 covers an opening at one end of the inner hole 311. The seat body heat dissipation structure 35 and a surface of the substrate portion 3421 away from the carrier 341 are fastened and in contact for thermal conduction. At least one flange 351 is disposed on an edge of the seat body heat dissipation structure 35. The flange 351 is fastened to an outer wall of the camera support 31 and is in contact for thermal conduction. In this way, the seat body 342 and the camera support 31 are fastened together by using the seat body heat dissipation structure 35 with thermal conduction.

In some embodiments, the seat body heat dissipation structure 35 is in contact with the second part 3472 in FIG. 23 for thermal conduction. Thermal conduction efficiency of contact thermal conduction is high, and heat of the drive chip 346 can be transmitted to the seat body heat dissipation structure 35 to a large extent.

To verify heat dissipation performance of the camera module 30 shown in FIG. 4 to FIG. 6, for a periscope camera module in which the chip heat dissipation structure 347, the coil heat dissipation structure 345, and the seat body heat dissipation structure 35 are not disposed (that is, an original design), temperatures of the optical lens 33, two coils 3441 (which are respectively a coil 1 and a coil 2, where coil currents are 40 mA), the drive chip 346, and the image sensor 362 are obtained through measurement and recorded in an original design column in Table 1. In addition, for a periscope camera module 30 in which the chip heat dissipation structure 347, the coil heat dissipation structure 345, and the seat body heat dissipation structure 35 are disposed and that is shown in FIG. 4, when coil currents are 40 mA (corresponding to case 1 in Table 1), 50 mA (corresponding to case 2 in Table 1), and 60 mA (corresponding to case 3 in Table 1), temperatures of the optical lens 33, two coils 3441 (which are respectively the coil 1 and the coil 2), the drive chip 346, and the image sensor 362 are obtained through measurement and respectively recorded in columns of case 1, case 2 and case 3 in Table 1. A temperature unit in Table 1 is ° C. It can be learned by comparison with data in Table 1 that, as the current of the coil 3441 gradually increases from 40 mA to 60 mA, the temperature of the optical lens 33 decreases from 81.0° C. in an original solution to 55.0° C./56.7° C./58.5° C. The temperature of the drive chip 346 decreases from 142° C. to 72.6° C. Therefore, it can be proved that the camera module 30 provided in embodiments of this application has good heat dissipation performance.

TABLE 1

| | Original design | Case 1 | Case 2 | Case 3 |
|---|---|---|---|---|
| Optical lens | 81 | 55.0 | 56.7 | 58.5 |
| Coil 1 | 77.4 | 55.8 | 58 | 60.6 |
| Coil 2 | 67.1 | 53.3 | 55.4 | 57.8 |
| Drive chip | 142.0 | 72.6 | 75.1 | 76.5 |
| Image sensor | 85.6 | 80.5 | 80.6 | 80.7 |

It should be noted that Table 1 is merely an example of a simulation result, and is used to describe heat dissipation performance of the camera module 30 provided in embodiments of this application. This does not constitute a special limitation on this application.

Refer to FIG. 26 to FIG. 28. FIG. 26 is a three-dimensional view of the camera module 30 according to still some embodiments of this application. FIG. 27 is an exploded view of the camera module 30 shown in FIG. 26. FIG. 28 is a three-dimensional cutaway view of the camera module 30 shown in FIG. 26 at a C-C line. In the embodiments, the camera module 30 is a vertical camera module. Specifically, the camera module 30 includes a camera support 31, an optical lens 33, a drive motor 34, and a photosensitive component 36. Refer to FIG. 29 and FIG. 30. FIG. 29 is a three-dimensional view of the drive motor 34 in the camera module 30 shown in FIG. 26 to FIG. 28. FIG. 30 is an exploded view of the drive motor 34 shown in FIG. 29. In the embodiments, the drive motor 34 includes a carrier 341, a seat body 342, an elastic component 343, a drive component 344, a drive chip 346, and a housing 348. The drive component 344 includes a coil 3441 and a magnet 3442, and the drive component 344 is configured to implement AF drive. In other embodiments, the drive component 344 is configured to implement an OIS drive.

Structures of the camera support 31, the optical lens 33, the photosensitive component 36, and the carrier 341, the seat body 342, the elastic component 343, the drive component 344, the drive chip 346, and the housing 348 in the drive motor 34 are the same as those in the conventional technology, and connection relationships between the two are the same. Therefore, details are not described in embodiments of this application.

It is similar to the foregoing periscope camera module that, as an ultimate focusing distance of the camera module 30 increases, heat generated by the coil 3441 increases, and a thickness of a wall of the carrier 341 is small. The heat of the coil 3441 is easily conducted to the optical lens 33; and consequently optical performance of the optical lens 33 is affected, and photographing quality of the camera module 30 seriously deteriorates.

To reduce impact of the heat generated by the coil 3441 on the optical lens 33, continue to refer to FIG. 30, and the drive motor 34 further includes a coil heat dissipation structure 345. The coil heat dissipation structure 345 is a high thermal conduction structure. Specifically, a material of the coil heat dissipation structure 345 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like.

In some embodiments, FIG. 31 is a schematic diagram of a structural assembly of the carrier 341 and the coil heat dissipation structure 345 in the drive motor 34 shown in FIG. 30. In the embodiments, the coil heat dissipation structure 345 is located between the carrier 341 and the coil 3441 in FIG. 30. When there are two coils 3441, there are also two coil heat dissipation structures 345. The two coil heat dissipation structures 345 are respectively located between the two coils 3441 and the carrier 341.

The coil heat dissipation structure 345 is fastened to the carrier 341. Specifically, the coil heat dissipation structure 345 may be fastened to the carrier 341 by adhesive, or may be formed as a whole with the carrier 341 by using a process such as insert molding (insert molding), thermal spraying, or electro chemical deposition. In other words, the coil heat dissipation structure 345 and the carrier 341 are a whole structure.

The coil 3441 is fastened to the coil heat dissipation structure 345 with thermal conduction. The coil 3441 may be directly fastened to the coil heat dissipation structure 345 by adhesive, and the like. Alternatively, the coil 3441 may be indirectly fastened to the coil heat dissipation structure 345. For example, refer to FIG. 15*a* and FIG. 15*b*, and the coil heat dissipation structure 345 is fastened to the carrier 341, and a fastening post 3411 is fastened to the carrier 341. The coil 3441 is wound and fastened to the fastening post 3411. Therefore, the coil 3441 is indirectly fastened to the coil heat dissipation structure 345 by using the fastening post 3411 and the carrier 341.

The coil 3441 and the coil heat dissipation structure 345 may be in direct contact for thermal conduction, or may conduct heat indirectly by using another intermediate structure. This is not specifically limited herein. In some embodiments, refer to FIG. 30, and a circuit board 3441*a* is disposed between the coil 3441 and the coil heat dissipation structure 345. The circuit board 3441*a* is configured to introduce a current to the coil 3441. The coil 3441 is in contact with the circuit board 3441*a* for thermal conduction, and the circuit board 3441*a* is in contact with the coil heat dissipation structure 345 for thermal conduction. In this way, thermal conduction is performed indirectly between the coil 3441 and the coil heat dissipation structure 345 by using the circuit board 3441*a*.

In the foregoing embodiments, the circuit board 3441*a* may be a rigid circuit board, or may be a flexible circuit board, or may be a rigid-flex circuit board. The circuit board 3441*a* may be an FR-4 dielectric board, or may be a Rogers (Rogers) dielectric board, or may be a Rogers and FR-4 hybrid dielectric board, or the like.

In some embodiments, the coil heat dissipation structure 345 includes a metal layer and a graphite layer that are disposed in a stacked manner. The metal layer is in contact with the circuit board 3441*a*, and the graphite layer is located on a side of the metal layer close to the carrier 341. Both the metal layer and the graphite layer have high thermal conductivity coefficients. Therefore, heat of the coil 3441 can be quickly absorbed. In addition, the graphite layer can prevent the heat generated by the coil 3441 from being conducted to a side close to the lens installation hole 341*a*.

An orthographic projection area of the coil 3441 on a first surface a of the carrier 341 is less than an orthographic projection area of the coil heat dissipation structure 345 on the first surface a of the carrier 341. The first surface a is a surface that is on the carrier 341 and that is configured to install the coil 3441. In this way, the coil heat dissipation structure 345 may disperse heat of the coil 3441 to a large region of a side wall of the carrier 341, to avoid heat concentration. In this way, impact of the heat generated when the coil 3441 works on the optical lens 33 can be reduced.

Continue to refer to FIG. 31. Damping adhesive 3412 is disposed on the carrier 341. There may be one or more pieces of damping adhesive 3412. For example, there are four pieces of damping adhesive 3412, and the four pieces of damping adhesive 3412 are distributed on two first surfaces a. The carrier 341 is in elastic contact with the support portion 3422 of the seat body 342 in FIG. 30 by using the damping adhesive 3412. In this way, impact wear caused by collision between the carrier 341 and the seat body 342 during a moving process can be reduced.

To further reduce the impact of the heat generated by the coil 3441 on optical performance of the optical lens 33, in some embodiments, the damping adhesive 3412 is a high thermal conduction structure. Specifically, the damping adhesive 3412 is at least one of silicon gel and acrylate rubber. The coil heat dissipation structure 345 is in thermal conduction with the damping adhesive 3412. In other words, thermal conduction can be performed between the coil heat dissipation structure 345 and the damping adhesive 3412. In this way, the heat of the coil 3441 may be conducted to the damping adhesive 3412, and further conducted to the seat body 342 by using the damping adhesive 3412. To some extent, conduction of the heat of the coil 3441 to the optical lens 33 can be avoided. Therefore, the impact of the heat generated by the coil 3441 on the optical lens 33 can be further reduced.

In the foregoing embodiments, the coil heat dissipation structure 345 may extend to a position of the damping adhesive 3412, to be in direct contact with the damping adhesive 3412 for thermal conduction, or may indirectly perform thermal conduction with the damping adhesive 3412 by using another intermediate structure. In some embodiments, continue to refer to FIG. 31, and the coil heat dissipation structure 345 extends to a position of the damping adhesive 3412, and is in direct contact with the damping adhesive 3412 for thermal conduction. Thermal conduction efficiency of direct contact thermal conduction is high, and the heat of the coil 3441 can be quickly conducted to the damping adhesive 3412.

Refer to FIG. 30. The drive chip 346 is fastened to the seat body 342. Specifically, the drive chip 346 may be directly fastened to the seat body 342, or may be indirectly fastened to the seat body 342 by using an intermediate structure. In some embodiments, the drive motor 34 further includes a circuit board 350. Specifically, the circuit board 350 may be a rigid circuit board, or may be a flexible circuit board, or may be a rigid-flex circuit board. The circuit board 350 may be an FR-4 dielectric board, or may be a Rogers (Rogers) dielectric board, or may be a Rogers and FR-4 hybrid dielectric board, or the like. The circuit board 350 is fastened to the seat body 342, and the drive chip 346 is fastened to the circuit board 350. In this way, the drive chip 346 is indirectly fastened to the seat body 342 by using the circuit board 350. The drive chip 346 is opposite to an outer surface of the carrier 341.

As an ultimate focusing distance of the camera module 30 increases, heat generated by the drive chip 346 also increases. Limited by an overall volume of the camera module 30, a distance between the drive chip 346 and the optical lens 33 is short. Therefore, the heat of the drive chip 346 may also be easily conducted to the optical lens 33, thereby affecting optical performance of the optical lens 33.

To reduce impact of the heat generated by the drive chip 346 on the optical lens 33, continue to refer to FIG. 30, and the drive motor 34 further includes a chip heat dissipation structure 347. The chip heat dissipation structure 347 is a high thermal conduction structure. Specifically, a material of the chip heat dissipation structure 347 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like.

FIG. 32 is a schematic structural diagram of a chip heat dissipation structure 347 in the drive motor 34 shown in FIG. 30. The chip heat dissipation structure 347 includes a first part 3471 and a second part 3472 that are fastened together with thermal conduction. Specifically, the first part 3471 and the second part 3472 may be directly connected, or may be indirectly connected by using another structure, or may be directly in contact for thermal conduction, or may indirectly conduct heat by using another intermediate structure. This is not specifically limited herein. In some embodiments, the chip heat dissipation structure 347 further includes a third part 3473. The third part 3473 is connected between the first part 3471 and the second part 3472. The first part 3471 and the second part 3472 are indirectly fastened together by using the third part 3473 with thermal conduction. In some embodiments, the first part 3471, the second part 3472, and the third part 3473 are integrally formed. In other words, the first part 3471, the second part 3472, and the third part 3473 are a whole structural part.

Refer to FIG. 33, FIG. 34, and FIG. 35. FIG. 33 is an assembly diagram of the seat body 342, the circuit board 350, the drive chip 346, the chip heat dissipation structure 347 in the drive motor 34 shown in FIG. 30, and the seat body heat dissipation structure 35 shown in FIG. 27. FIG. 34 is a three-dimensional cutaway view of the assembly diagram shown in FIG. 33 at a D-D line. FIG. 35 is an enlarged view of an area II in the cutaway view shown in FIG. 34. The chip heat dissipation structure 347 is fastened to the seat body 342. Specifically, the chip heat dissipation structure 347 may be fastened to the seat body 342 by adhesive dispensing, insert molding (insert molding), welding, and the like. The first part 3471 is located on a side of the drive chip 346 close to the carrier 341 in FIG. 30, and the first part 3471 is in thermal conduction with the drive chip 346. In other words, heat can be transmitted between the first part 3471 and the drive chip 346. Therefore, the first part 3471 can absorb the heat of the drive chip 346. The first part 3471 may be in a block shape, a sheet shape, and the like. This is not specifically limited herein. In some embodiments, the first part 3471 is in a sheet shape. In this way, the first part 3471 occupies small space in the drive motor 34. In some embodiments, a projection of the drive chip 346 on the first part 3471 in a direction close to the carrier 341 is located in the first part 3471. In this way, the first part 3471 can shield the drive chip 346, and the first part 3471 can absorb the heat generated by the drive chip 346 during a working process to a large extent.

On the basis of the foregoing embodiments, the first part 3471 may be made of a metal material as a whole, or may be made of a combination of a metal material and a non-metal material. This is not specifically limited herein. In some embodiments, the first part 3471 includes a metal layer and a graphite layer that are disposed in a stacked manner. The first part 3471 includes a metal layer and a graphite layer that are disposed in a stacked manner in an X-axis direction. The graphite layer is located on a side of the metal layer close to the carrier 341 in FIG. 30. Both the metal layer and the graphite layer have high thermal conductivity coefficients. Therefore, the heat of the drive chip 346 can be quickly absorbed. In addition, the graphite layer can prevent the heat generated by the drive chip 346 from being transmitted to a side close to the carrier 341. A material of the metal layer includes but is not limited to copper and a copper alloy. In addition, the graphite layer may be formed on the metal layer by electro chemical deposition, spraying, and the like. This is not specifically limited herein.

The first part 3471 may be in direct contact with the drive chip 346 for thermal conduction, or may be spaced apart with the drive chip 346 to implement heat transmission in a manner of heat radiation. This is not specifically limited herein. In some embodiments, refer to FIG. 35, and the first part 3471 and the drive chip 346 are spaced apart. A gap width h between the first part 3471 and the drive chip 346 is greater than 0 mm and is less than or equal to 1 mm. Optionally, the gap width h between the first part 3471 and the drive chip 346 is equal to 0.05 mm/0.2 mm/0.5 mm. In this way, a distance between the first part 3471 and the drive chip 346 is moderate, and the heat of the drive chip 346 can be transmitted to the first part 3471 to a large extent. In addition, when the first part 3471 is made of a conductive material such as metal, impact of the first part 3471 on electrical performance of the drive chip 346 can be avoided, thereby ensuring reliability of the drive chip 346.

The second part 3472 is fastened to the seat body 342 with thermal conduction. Specifically, the second part 3472 and the seat body 342 may be directly connected, or may be indirectly connected by using another structure, or may be in direct contact for thermal conduction, or may indirectly conduct heat by using another intermediate structure. This is not specifically limited herein. In this way, the heat absorbed by the first part 3471 may be conducted to the seat body 342 by using the third part 3473 and the second part 3472, to avoid transmission of the heat of the drive chip 346 to the carrier 341.

In some embodiments, the second part 3472 is located on a side of the substrate portion 3421 of the seat body 342 away from the carrier 341 in FIG. 10, and the second part 3472 is in contact with and fastened to a surface of the substrate portion 3421 away from the carrier 341. In this way, the heat absorbed by the first part 3471 can be conducted, by using the third part 3473 and the second part 3472, to a surface of the substrate portion 3421 away from the carrier 341 in FIG. 10, to avoid heat transmission to the direction close to the carrier 341. In this way, impact of the heat generated by the drive chip 346 on the optical lens 33 is reduced.

In some embodiments, the second part 3472 and the third part 3473 are alternatively in a sheet shape. In addition, the second part 3472 and the third part 3473 also include a metal layer and a graphite layer that are disposed in a stacked manner. The metal layer of the third part 3473 is connected between a metal layer of the first part 3471 and a metal layer of the second part 3472. In some embodiments, the metal layer of the first part 3471, the metal layer of the second part 3472, and the metal layer of the third part 3473 are integrally formed. The graphite layer of the third part 3473 is connected between a graphite layer of the first part 3471 and a graphite layer of the second part 3472. In some embodiments, the graphite layer of the first part 3471, the graphite layer of the second part 3472, and the graphite layer of the third part 3473 are integrally formed. In this way, heat of the first part 3471 can be effectively conducted to the second part 3472, and the chip heat dissipation structure 347 has a simple composition structure and is easy to manufacture.

Further, refer to FIG. 26 and FIG. 27. The camera module 30 further includes a seat body heat dissipation structure 35. The seat body heat dissipation structure 35 is a high thermal conduction structure. Specifically, a material of the seat body heat dissipation structure 35 may be one or more of metal, non-metal doped with metal powder, graphite, thermal adhesive, and thermally conductive silicone. The metal may be one or more of copper, iron, aluminum, a copper alloy, a ferroalloy, an aluminum alloy, and the like.

Refer to FIG. 36 and FIG. 37. FIG. 36 is an assembly diagram of the seat body 342 and the chip heat dissipation structure 347 in the drive motor 34 shown in FIG. 30, the seat body heat dissipation structure 35, and the camera support 31 shown in FIG. 27. FIG. 37 is a three-dimensional cutaway view of the assembly diagram shown in FIG. 36 at an E-E line. The seat body heat dissipation structure 35 is fastened between the seat body 342 of the drive motor 34 and the camera support 31 with thermal conduction. In other words, the seat body heat dissipation structure 35 is fastened between the seat body 342 and the camera support 31, the seat body heat dissipation structure 35 is in thermal conduction with the seat body 342, and the seat body heat dissipation structure 35 is in thermal conduction with the seat body 342. In this way, the seat body heat dissipation structure 35 can conduct heat of the seat body 342 to the camera support 31, and further use the camera support 31 to conduct the heat to a structure (for example, the middle plate 23) that is in the electronic device 100 and that is configured to support the camera module 30.

In some embodiments, the seat body heat dissipation structure 35 is in contact with the seat body 342 for thermal conduction. Specifically, refer to FIG. 35. The seat body heat dissipation structure 35 is fastened to a surface of the substrate portion 3421 away from the carrier 341 and is in contact for thermal conduction. Refer to FIG. 37. The seat body heat dissipation structure 35 is fastened to the camera support 31 and is in contact for thermal conduction. In this way, the seat body 342 of the drive motor 34 and the camera support 31 are fastened together by using the seat body heat dissipation structure 35 with thermal conduction.

In some embodiments, refer to FIG. 35, and the seat body heat dissipation structure 35 is in contact with the second part 3472 for thermal conduction. Thermal conduction efficiency of contact thermal conduction is high, and heat of the drive chip 346 can be transmitted to the seat body heat dissipation structure 35 to a large extent. In this way, heat dissipation efficiency of the drive chip 346 can be improved.

It can be learned from the foregoing descriptions that, it is similar to the periscope camera module described above that, an improvement of the vertical camera module provided in embodiments of this application lies in that the coil heat dissipation structure 345, the chip heat dissipation structure 347, and the seat body heat dissipation structure 35 are added, to conduct heat of the coil 3441 and the drive chip 346 outward to the camera support 31, so as to further conduct heat to the middle frame. Therefore, impact of heat on the optical lens 33 is reduced.

In the descriptions of this specification, the described specific features, structures, materials, or characteristics may be combined in a proper manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A drive motor, comprising:

a carrier comprising a lens installation hole configured to have an optical lens installed therein;

a coil located on an outer side of the carrier; and a coil heat dissipation structure located between the carrier and the coil, wherein the coil heat dissipation structure is fastened to the carrier, and the coil is fastened to and is in thermal conduction with the coil heat dissipation structure; and a damping adhesive and a seat body, wherein:

the damping adhesive is disposed on the carrier, and the carrier is in contact with the seat body through the damping adhesive, the damping adhesive is a high thermal conduction structure, and the coil heat dissipation structure is in thermal conduction with the damping adhesive.

2. The drive motor according to claim 1, wherein:

a material of the coil heat dissipation structure comprises one or more of metal, non-metal doped with metal powder, graphite, thermal adhesive, or thermally conductive silicone; and the metal is one or more of copper, iron, aluminum, a copper alloy, a ferroalloy, or an aluminum alloy.

3. The drive motor according to claim 1, wherein:

the coil heat dissipation structure comprises a metal layer and a graphite layer that are disposed in a stacked manner;

the metal layer and the coil are fastened to each other and in thermal conduction with each other;

the graphite layer is located on a side of the metal layer close to the lens installation hole; and a material of the metal layer is one or more of copper, iron, aluminum, a copper alloy, a ferroalloy, or an aluminum alloy.

4. The drive motor according to claim 1, further comprising a drive chip and a chip heat dissipation structure, wherein the drive chip is fastened to the seat body;

the chip heat dissipation structure comprises a first part and a second part;

the first part is located on a side of the drive chip close to the carrier; the first part is in thermal conduction with the drive chip; and the second part is fastened to the seat body with thermal conduction.

5. The drive motor according to claim 4, further comprising a groove provided on a surface of the seat body facing the carrier, wherein the drive chip is accommodated in the groove, and the first part of the chip heat dissipation structure covers and is fastened to an opening of the groove.

6. The drive motor according to claim 4, wherein the first part and the drive chip are spaced apart, and a gap width between the first part of the chip heat dissipation structure and the drive chip is greater than 0 mm and is less than or equal to 1 mm.

7. The drive motor according to claim 4, wherein:

a material of the first part of the chip heat dissipation structure comprises one or more of metal, non-metal doped with metal powder, graphite, thermal adhesive, or thermally conductive silicone; and wherein the metal is one or more of copper, iron, aluminum, a copper alloy, a ferroalloy, or an aluminum alloy.

8. The drive motor according to claim 4, wherein:

the first part of the chip heat dissipation structure comprises a metal layer and a graphite layer that are disposed in a stacked manner;

the metal layer is in thermal conduction with the drive chip;

the graphite layer is located on a first side of the metal layer that is closer to the carrier than a second side of the graphite layer opposite the first side; and a material of the metal layer is one or more of copper, iron, aluminum, a copper alloy, a ferroalloy, or an aluminum alloy.

9. The drive motor according to claim 4, wherein:

the second part of the chip heat dissipation structure is located on a side of the seat body that is facing away from the carrier; and the second part of the chip heat dissipation structure is in contact with and fastened to a surface of the seat body facing away from the carrier.

10. A camera module, comprising the optical lens, a photosensitive component and the drive motor according to claim 1, wherein the optical lens is installed in the lens installation hole of the drive motor, the photosensitive component is located on an out-light side of the optical lens, and the photosensitive component and the drive motor are fastened together.

11. The camera module according to claim 10, further comprising an optical path turning element located on a light incident side of the optical lens, the optical path turning element configured to turn light incident in a first direction to be emitted in a second direction, wherein:

the first direction is perpendicular to the second direction;

a light incident surface of the optical lens is opposite to an out-light surface of the optical path turning element; and the second direction is parallel to an optical axis of the optical lens.

12. The camera module according to claim 10, further comprising:

a camera support having an inner hole provided therein, wherein the drive motor is disposed in the inner hole; and a connector disposed on an outer wall of the camera support, wherein the camera support is configured to be fastened to an electronic device via the connector.

13. The camera module according to claim 12, wherein:

the camera support is made of a metal material;

the camera module further comprises a seat body heat dissipation structure fastened between the seat body of the drive motor and the camera support; and the seat body heat dissipation structure is in thermal conduction with the seat body of the drive motor and the camera support.

14. A drive motor, comprising:

a carrier comprising a lens installation hole configured to have an optical lens installed therein;

a seat body comprising a first surface facing the carrier, wherein a groove is provided on the first surface;

a drive chip fastened to the seat body and accommodated in the groove; and a chip heat dissipation structure comprising a first part and a second part, wherein the first part is located on a first side of the drive chip facing the carrier, the first part is in thermal conduction with the drive chip, the second part is fastened to and is in thermal conduction with the seat body, and the first part covers and is fastened to an opening of the groove.

15. The drive motor according to claim 14, wherein:

the second part of the chip heat dissipation structure is located on a side of the seat body facing away from the carrier;

and the second part is in contact with and fastened to a second surface of the seat body facing away from the carrier.

16. A camera module, comprising:

a drive motor comprising a carrier, a coil, and a coil heat dissipation structure, wherein the carrier comprises a lens installation hole, the coil is located on an outer side of the carrier, the coil heat dissipation structure is located between the carrier and the coil, the coil heat dissipation structure is fastened to the carrier, and the coil is fastened to and in thermal conduction with the coil heat dissipation structure;

an optical lens disposed within the lens installation hole; and a photosensitive component located on an out-light side of the optical lens and fastened to the drive motor; and a damping adhesive and a seat body, wherein:

the damping adhesive is disposed on the carrier, and the carrier is in contact with the seat body through the damping adhesive, the damping adhesive is a high thermal conduction structure, and the coil heat dissipation structure is in thermal conduction with the damping adhesive.

17. The camera module according to claim 16, further comprising an optical path turning element located on a light incident side of the optical lens, wherein:

the optical path turning element is configured to turn light incident in a first direction to be emitted in a second direction;

the first direction is perpendicular to the second direction; and a light incident surface of the optical lens is opposite from an out-light surface of the optical path turning element; and the second direction is parallel to an optical axis of the optical lens.

18. The camera module according to claim 16, further comprising:

a camera support having an inner hole provided therein, wherein the drive motor is disposed in the inner hole; and a connector disposed on an outer wall of the camera support, wherein the camera support is configured to be fastened to an electronic device via the connector.

19. The camera module according to claim 16, wherein:

the coil heat dissipation structure comprises a metal layer and a graphite layer that are disposed in a stacked manner;

the metal layer and the coil are fastened to each other and in thermal conduction with each other;

the graphite layer is located on a side of the metal layer close to the lens installation hole; and a material of the metal layer is one or more of copper, iron, aluminum, a copper alloy, a ferroalloy, or an aluminum alloy.

20. The camera module according to claim 16, further comprising a drive chip and a chip heat dissipation structure, wherein the drive chip is fastened to the seat body;

the chip heat dissipation structure comprises a first part and a second part;

the first part is located on a side of the drive chip close to the carrier; the first part is in thermal conduction with the drive chip; and the second part is fastened to the seat body with thermal conduction.

* * * * *